(12) United States Patent
Pochan et al.

(10) Patent No.: US 12,545,707 B2
(45) Date of Patent: Feb. 10, 2026

(54) PEPTIDIC MACROMOLECULAR ASSEMBLIES

(71) Applicants: University of Delaware, Newark, DE (US); Trustees of the University of Pennsylvania, Philadelphia, PA (US)

(72) Inventors: Darrin J. Pochan, Landenberg, PA (US); Christopher James Kloxin, Landenberg, PA (US); Jeffery G. Saven, Philadelphia, PA (US); Dongdong Wu, Newark, DE (US); Jose A. Villegas, Rehovot (IL); Huixi Violet Zhang, Eagleville, PA (US)

(73) Assignees: University of Delaware, Newark, DE (US); Trustees of the University of Pennsylvania, Philadelphia, PA (US)

( * ) Notice: Subject to any disclaimer, the term of this patent is extended or adjusted under 35 U.S.C. 154(b) by 183 days.

(21) Appl. No.: 16/797,628

(22) Filed: Feb. 21, 2020

(65) Prior Publication Data

US 2020/0361996 A1    Nov. 19, 2020

Related U.S. Application Data

(63) Continuation of application No. PCT/US2018/047331, filed on Aug. 21, 2018.

(60) Provisional application No. 62/548,030, filed on Aug. 21, 2017.

(51) Int. Cl.
| | |
|---|---|
| *C07K 19/00* | (2006.01) |
| *C07K 14/00* | (2006.01) |
| *C09K 19/38* | (2006.01) |
| *D01F 9/00* | (2006.01) |

(52) U.S. Cl.
CPC ............ *C07K 14/001* (2013.01); *C07K 19/00* (2013.01); *C09K 19/389* (2013.01); *D01F 9/00* (2013.01)

(58) Field of Classification Search
None
See application file for complete search history.

(56) References Cited

U.S. PATENT DOCUMENTS

| | | | | |
|---|---|---|---|---|
| 7,504,111 | B2 * | 3/2009 | Fontana ................. | A61P 31/04 424/249.1 |
| 7,858,585 | B2 * | 12/2010 | Ozbas ..................... | A61L 27/22 514/21.4 |
| 7,884,185 | B2 * | 2/2011 | Schneider ............... | A61K 9/06 530/326 |
| 8,221,773 | B2 * | 7/2012 | Schneider ............... | A61P 19/00 424/400 |
| 8,426,559 | B2 * | 4/2013 | Salick ..................... | C07K 7/08 530/326 |
| 8,834,926 | B2 * | 9/2014 | Schneider ............... | A61K 9/06 424/484 |
| 8,907,064 | B2 | 12/2014 | Cho et al. | |
| 2010/0015173 | A1 | 1/2010 | Boato et al. | |
| 2016/0009770 | A1 | 1/2016 | Xu et al. | |
| 2018/0267019 | A1 * | 9/2018 | Langhans ............... | A61P 17/02 |

OTHER PUBLICATIONS

Buchwald, Tomasz et al; "Determination of collagen fibers arrangement in bone tissue by using transfomrations of raman spectra maps." Spectroscopy (2012) 27(2) p. 107-117.*
Li , Jiangou et al, "Membrane active antimicrobial peptides: translating mechanistic insights to design." Front. Neurosci. (2017) 11(73).*
Zhou, X. Edward et al; "X-ray laser differaction for structure determination of the rhodopsin-arrestin complex." Sci. Data (2016) DOI: 10.1038/sdata.2016.21.*
Lindsey, Stephan et al; "Beta hairpin peptide hydrogels as an injectable solid vehicle for neurotrophic growth factor delivery." Biomacromol. (2015) 16 p. 2672-2683.*
Callaway, Ewon; "'It will change everything': ai makes gigantic leap in solving protein structures." Nature (2020) 588 p. 203-204.*
Kodadek, Thomas et al; "Techniques: oxidative cross-linking as an emergent tool for the analysis of receptor-mediated signalling events." Trends Pharmcol. Sci. (2005) 26(4) p. 210-217.*
Trahan, Christian and Oeffinger, Marlene; "Targeted cross-linking-mass spectrometery determines vicinal ineratcomes within hertogenous rnp complexes." Nucl. Acids Res. (2016) 44(3) p. 1354-1369.*
Van der Kant, Rob and Vriend, Gert; "Alpha-bulges in g protein coupled receptors." Int. J. Mol. Sci. (2014) 15 p. 7841-7864.*
Neves, Susana R. et al.; "G protein pathways." Science (2002) 296 p. 1636-1639.*
Huang, Fang and Nau, Werner M.; "A conformational flexibility scale for amino acids in peptides." Angew. Chem. Int. Ed. (2003) 42 p. 2269-2272.*
Fujita, Seiya and Matuura, Kazunori; "Self-assembled artificial viral capsids bearing coiled coils at the surface." Org. Biomol. Chem. (May 2017) 15 p. 5070-5077.*
Mergler, M. and Durieux, J. P.; Bachem practice of SPPS (2005).*
Rocklin, Gabriel J. et al; "Global analysis of protein folding using massively parallel design, synthesis, and testing." Science (2017) 357 p. 168-175.*
Everse, S. J.; https://comis.med.uvm.edu/VIC/coursefiles/MD540/MD540-Protein_Organization_10400_574581210/Protein-org/Protein_Organization3.html, available 2014.*
Formela, Krzysztof et al; "Curing characteristics, mechanical and thermal properties of reclaimed ground tire rubber cured with various vulcanizing systems." Iran. Polym. J. (2015) 24 p. 289-297.*
Lowe, Derek; "Not alphafold's fault." blog "In the Pipeline" issue of Sep. 7, 2022.*

(Continued)

*Primary Examiner* — Fred H Reynolds
(74) *Attorney, Agent, or Firm* — Buchanan Ingersoll & Rooney PC

(57) ABSTRACT

Provided is a non-natural macromolecular assembly that includes at least two peptide bundles and at least one linker moiety covalently linking the peptide bundles. The assembly may be used, for example, in liquid crystal materials and fibers.

13 Claims, 40 Drawing Sheets

Specification includes a Sequence Listing.

(56) References Cited

OTHER PUBLICATIONS

Angell, Yu L. and Burgess, Kevin; "Peptidomimetics via copper catalyzed azide alkyne cycloadditions." Chem. Soc. Rev. (2007) 36 p. 1674-1689.*

Cooper, J; "Properteis of the alpha helix." Birbeck University of London page on helices (1995) (https://www.cryst.bbk.ac.uk/PPS95/course/3_geometry/helix2.html#:~:text=Properties%20of%20the%20alpha%2Dhelix,long%20would%20form%2010%20turns.*

International Search Report and Written Opinion for International Application No. PCT/US2018/047331, dated Oct. 29, 2018, 7 pages.

Dong et al., "Self-assembly of a-Helical Coiled Coil Nanofibers", 2008, vol. 130(41), p. 13691-13695, J. Am. Chem. Society.

Guo et al., "Computational Design of Homotetrameric Peptide Bundle Variants Spanning a Wide Range of Charge States", 2022, vol. 23, pp. 1652-1661, Biomacromolecules.

Hakemi, H., "Polymer-dispersed Liquid Crystal Technology Industrial Evolution and Current Market Situation", 2017, vol. 26(3), pp. 70-73, Liquid Crystals Today.

Huang, P.S. et al., "High Thermodynamic Stability of Parametrically Designed Helical Bundles", Oct. 24, 2014, vol. 346(6208), pp. 481-485, Science.

Kojima et al., "Fibril Formation by an Amphipathic a-Helix-Forming Polypeptide Produced by Gene Engineering", 1997, vol. 73, Series B, pp. 7-11, Proc. Japan Acad.

Kolb et al., "Click Chemistry: Diverse Chemical Function from a few Good Reactions", 2001, vol. 40, pp. 2004-2021, Angew. Chem. Int. Ed.

Lanci et al., "Computational Design of a Protein Crystal", May 8, 2012, vol. 109(19), pp. 7304-7309, PNAS.

Li et al., "Critical Evaluation of In Silico Methods for Prediction of Coiled-Coil Domains in Proteins", 2016, vol. 17(2), 14 pages, Briefings in Bioinformatics, Oxford.

McAllister et al., "Using a-Helical Coiled-Coils to Design Nanostructured Metalloporphyrin Arrays", 2008, vol. 130(36), pp. 11921-11927, J. Am. Chem. Soc.

Pandya et al., "Sticky-End Assembly of a Designed Peptide Fiber Provides Insight into Protein Fibrillogenesis", 2000, vol. 39(30), pp. 8728-8734, Biochemistry.

Parry et al., "Fibrous Proteins: Structures and Mechanisms", Subcellular Biochemistry, 2017, vol. 82, 630 pages.

Potekhin et al., "De Novo Design of Fibrils Made of Short a-Helical Coiled Coil Peptides", Research Paper, 2001, pp. 1025-1032, Chemistry & Biology 8, Elsevier.

Reinke et al., "A Synthetic Coiled-Coil Interactome Provides Heterospecific Modules for Molecular Engineering", 2010, vol. 132(17), pp. 6025-6031, J. Am. Chem. Soc.

Ryadnov et al., "Introducing Branches into a Self-Assembling Peptide Fiber", 2003, vol. 115, pp. 3129-3131, Angew. Chem.

"Smart Glass Market Expected to Reach $8729 Million, Globally by 2022", Feb. 23, 2017, 2 pages.

Smart Glass Market Size Worth $12.76 Billion by 2030, Jul. 2022, 5 pages, Retrieved from the Internet; https://www.grandviewresearch.com/press-release/global-smart-glass-market#.

Usov et al., "FiberApp: An Open-Source Software for Tracking and Analyzing Polymers, Filaments, Biomacromolecules, and Fibrous Objects", 2015, vol. 48, pp. 1269-1280, Macromolecules.

Wood et al., "CCBuilder: An Interactive Web-Based Tool for Building, Designing and Assessing Coiled-Coil Protein Assemblies", 2014, vol. 30(21), pp. 3029-3035, Bioinformatics.

Zhang, Z. et al., "Liquid Crystal Materials for Biomedical Applications", 2023, Advanced Materials, 74 pages.

Zhang, H.V. et al., "Computationally Designed Peptides for Self-Assembly of Nanostructured Lattices", Research Article, Nanomaterials, Sci. Adv. 2016;2:e1600307, Sep. 9, 2016, 9 pages.

* cited by examiner

Semiflexible chains: produced with 4459b or P622-a6 and PETMP

Top view down
blue bundle axis

Figure 37

| Peptides | Sequence |
|---|---|
| | N · · · · · · · · · · · · · · · · · · · · · · · · · · · C |
| 1 | Mal-DEKIKNM ADQIKHM AWMIDRM AEKIDRE A |
| 2 | C-DEEIRRM AEEIRQM AERIQQM AEQIQQE A |
| 3 | Mal-DEKIKNM ADQIKHM AWMIDRM AEKIDRE A |
| 4 | Mal-DEKIKNM ADQIKHM AWMIDRM AEKIDRE A |
| 5 | Mal-REEIRRM AEEIRRM AREIERM AEEIERR A |

PEPTIDIC MACROMOLECULAR ASSEMBLIES

CROSS-REFERENCE TO RELATED APPLICATIONS

This is application is Continuation application of International Application No. PCT/US2018/047331, filed Aug. 21, 2018 (pending), which claims priority to U.S. Provisional Application No. 62/548,030, filed Aug. 21, 2017. The disclosure of each of these applications is incorporated herein by reference in its entirety for all purposes.

STATEMENT REGARDING FEDERALLY-SPONSORED RESEARCH

This invention was made with government support under DMREF/UD Grant No. 1235084, awarded by the National Science Foundation, and by DMREF/UPenn Grant No. 1234161, awarded by the National Science Foundation. The government has certain rights in the invention.

The Sequence Listing for this application is labeled "UOD-494US_SequenceListing_ST25_20200708" which was created on Jul. 8, 2020, with a file size of 2.19 KB. The entire contents of the sequence listing is incorporated herein by reference in its entirety.

FIELD OF THE INVENTION

The present invention relates to non-natural macromolecular assemblies that include at least two peptide bundles and at least one linker moiety covalently linking the peptide bundles. The assembly may be used as a component of, for example, liquid crystal materials and fibers.

BACKGROUND OF THE INVENTION

Natural proteins exhibit exquisite combinations of structure and function by virtue of the folding of their amino acid sequences. The folded protein structure provides specificity in the spatial display of chemical groups. Synthetic, i.e., non-natural, polymer materials, in contrast, lack such specificity in shape and chemical display but do provide limitless choices of chemical monomers and functionalization strategies for materials design. While natural proteins have rightfully served as long-standing inspiration for the design of assembled materials with controllable structures and sizes, methods to prescribe non-natural protein or peptide solution assembled structures made with synthetic peptide building blocks remain in their infancy. The present invention integrates the shape and size programmability of peptide assembly with the synthetic chemistry possible with non-biological monomers to create a new paradigm in materials design.

SUMMARY OF THE INVENTION

As described herein, the present invention provides a non-natural macromolecular assembly, comprising:
at least two peptide bundles and
at least one linker moiety covalently linking the peptide bundles.

In a preferred embodiment of the invention, at least one peptide bundle is a helical bundle.

In another preferred embodiment of the invention, at least one peptide bundle is a coiled coil bundle.

In another preferred embodiment of the invention, at least one peptide bundle comprises at least two peptides that are non-covalently associated.

In another preferred embodiment of the invention, at least one peptide bundle comprises a single peptide.

In another preferred embodiment of the invention, at least one peptide bundle comprises a single peptide in the form of a coiled coil bundle.

In another preferred embodiment of the invention, the linker moiety comprises a reaction product of complementary click chemistry reactive functional groups on the peptide bundles covalently linked by the linker moiety.

In another preferred embodiment of the invention, at least one of the complementary click chemistry reactive functional groups is at the N- or C-terminus of a peptide bundle.

In another preferred embodiment of the invention, at least one of the complementary click chemistry reactive functional groups is on a side chain of an amino acid of a peptide bundle.

In another preferred embodiment of the invention, the linker moiety comprises the reaction product of a click chemistry reactive functional group on a peptide bundle and a complementary click chemistry reactive functional group on a spacer moiety.

In another preferred embodiment of the invention, the spacer moiety is pentaerythritol tetra(3-mercaptopropionate) (PETMP) or an inorganic nanoparticle.

In another preferred embodiment of the invention, the spacer moiety comprises at least one polyethylene glycol moiety.

In another preferred embodiment of the invention, the spacer moiety comprises at least four polyethylene glycol moieties.

In another preferred embodiment of the invention, at least one peptide bundle comprises at least one non-natural amino acid.

In another preferred embodiment of the invention, each of the peptide bundles comprise a plurality of peptides, wherein each peptide, independently, has a length of at least 7 amino acids.

In another preferred embodiment of the invention, at least one peptide bundle comprises an amino acid residue having a side chain functionalized with a polymer.

In another preferred embodiment of the invention, the assembly is a one-dimensional assembly.

In another preferred embodiment of the invention, the assembly is a two-dimensional assembly.

In another preferred embodiment of the invention, the assembly is a three-dimensional assembly.

In another preferred embodiment of the invention, at least one peptide bundle comprises at least two peptides and has approximate rotational or dihedral symmetry.

In another preferred embodiment of the invention, at least one peptide bundle comprises an amino acid having a side chain functionalized with a drug molecule, RNA molecule, another biofunctional peptide (e.g., ligand or antigen), polysaccharide, glycosaminoglycan, fluorescent dye, semiconductive organic molecule, catalyst or inorganic nanoparticle.

The present invention also provides a method of preparing the non-natural macromolecular assembly by covalently linking the peptide bundles via the linker moiety.

The present invention is also directed to a liquid crystal material comprising the non-natural macromolecular assembly as described herein.

The present invention also provides a fiber comprising the non-natural macromolecular assembly as described herein.

The Figures provided herein illustrate preferred and/or exemplary embodiments of the present invention. The embodiments described in the Figures are not intended to limit the invention in any respect.

BRIEF DESCRIPTION OF THE FIGURES

FIG. 37: Peptides sequences 1-5 are shown. Peptide 1 (SEQ ID NO: 3) was used as described for FIGS. 33-36. Peptide 2 (SEQ ID NO: 1) used as described for FIGS. 33, 34, and 35. Both peptide 3 (SEQ ID NO: 3) and peptide 4 (SEQ ID NO: 3) were used as described for FIG. 35. Peptide 5 (SEQ ID NO: 2) was used as described for FIG. 36.

DETAILED DESCRIPTION OF THE INVENTION

Figure 1:
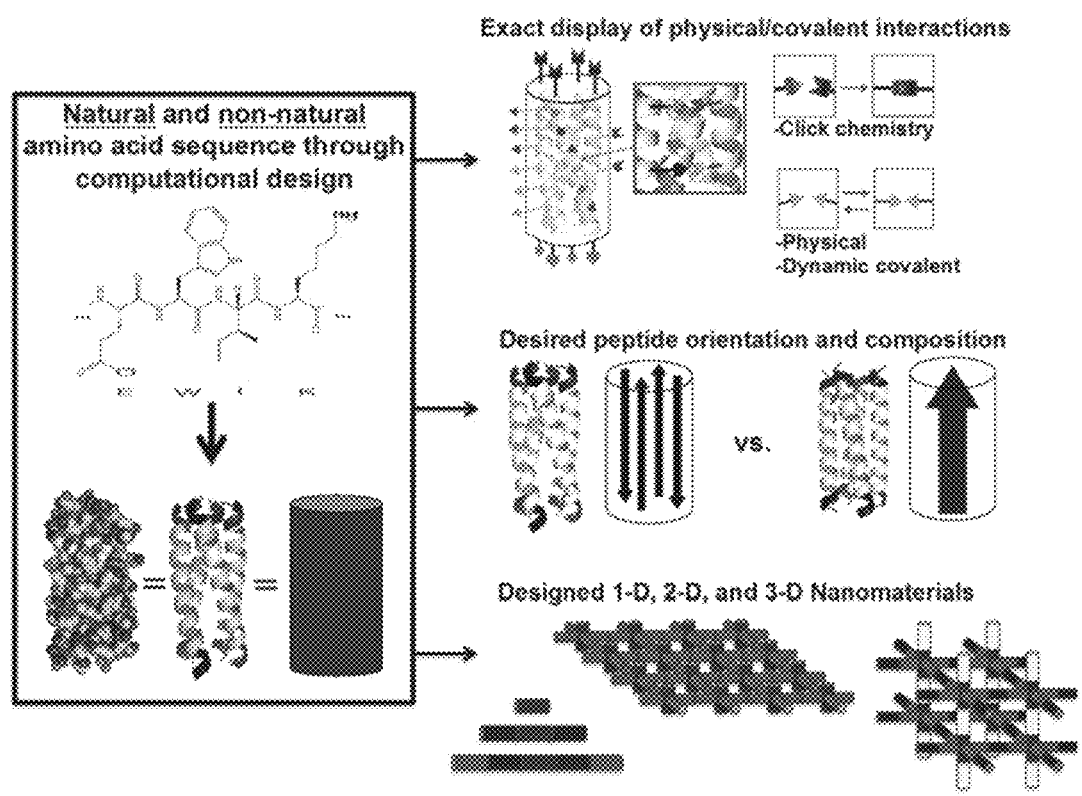
FIG. 1: A design process of exemplary coiled coil bundles that may serve as a fundamental building block/monomer of the assemblies of the present invention is illustrated.

In addition to co-opting motifs from natural proteins and peptides for solution assembly, the present invention uses computational design to craft peptides, containing combinations of natural and, optionally, non-natural amino acids, for assembly of exotic materials, e.g., fibers, network materials and liquid crystals. The computational design of the peptide molecules is performed in the context of the desired, predetermined, customizable folded nanostructure into which the peptides can intermolecularly assemble in aqueous solution. The target materials can exhibit extreme material properties including predetermined morphologies (e.g., ultra-stiff, rigid-rod polymers), exotic mechanical behavior (e.g., fibers exhibiting high stiffness, strength, and extreme elongation) and healing responses to deformation. The complementary and engineered use of noncovalent and covalent interactions can allow processing (i.e., hierarchical assembly and annealing) of target assemblies, while also conferring robustness, to create designed materials.

Thus, the present invention provides non-natural macromolecular assemblies that possess these properties. The term "non-natural" means that the assemblies have one or more of the following properties: are created by synthetic procedures, do not use protein sequences that occur in nature, contain at least one non-natural amino acid, and/or contain a synthetic linker moiety as discussed herein. In particular, the assemblies need not be composed solely of the canonical twenty naturally-occurring amino acids. The assemblies of the present invention are non-natural structures that include at least two peptide bundles and at least one linker moiety covalently linking the peptide bundles.

As used herein, the term "peptide bundle" refers to two or more peptides or one peptide/protein that generally form(s) an ordered structure (e.g., alpha helices) under physiologic conditions (e.g., in aqueous solution at pH 7.2, 22° C., under physiologically-relevant salt concentrations). Thus, the bundle may be composed of multiple peptides which assemble into the desired structure. Alternatively, the bundle may be composed of a single peptide or protein sequence that assembles into the desired structure. As described in detail below, the peptide bundles preferably assemble into helical structures, with coiled coil structures being especially preferred. The design of such structures is well-known in the art.

As used herein, the term "linker moiety" refers to a structural group that covalently links peptide bundles together in the macromolecular assembly of the present invention. As described below, in some embodiments of the invention, the linker moiety is formed by reacting complementary reactive functional groups on peptide bundles. See FIGS. 8-16 for exemplary illustrations of this embodiment of the invention. In other embodiments, the linker moiety is formed by reacting reactive functional groups on a spacer moiety with complementary reactive functional groups on peptide bundles. In this embodiment, the linker moiety includes a spacer moiety. See FIGS. 19-23 for exemplary illustrations of this embodiment of the invention.

As used herein, the term "complementary reactive functional groups" refers to reactive functional groups in which a first reactive functional group is capable of reacting with a second reactive functional group to form at least one covalent bond between the reactive functional groups. For example, a maleimide functional group and a thiol functional groups may be considered complementary reactive functional groups because these functional groups are reactive with each other, where a Michael-type addition takes place such that the sulfur atom of the thiol functional group becomes covalently bonded to a carbon atom of the maleimide.

The linker moiety is preferably derived from at least one reactive functional group that does not naturally occur in peptide and protein sequences, i.e., a "synthetic" linker moiety. In particular, it is preferred that the linker moiety is not the result of formation of a disulfide bond or amide bond. In particular, the linker moiety is preferably not solely an amino acid or amino acid sequence containing naturally-occurring amino acid residues. In particular, the assembly of the present invention is not a fusion protein in which peptide bundles are linked together by amino acid sequences. Rather, the linker moiety preferably contains at least one chemical group or moiety that is not found in proteins in nature. In a preferred embodiment of the invention, the linker is or includes a reaction product of a maleimide group and a thiol group (—SH). Thus, while one peptide bundle can have a cysteine (Cys) residue at the N-terminus, for example, which provides a reactive thiol group (—SH), the complementary peptide bundle will contain a non-natural complementary reactive functional group, e.g., a maleimide group, that reacts with the thiol group to produce the linker moiety. Thus, the resulting linker moiety is a synthetic construct because maleimide groups are not found in naturally-occurring protein sequences.

The nature of the optional spacer moiety may vary widely and is not particularly limited. Although the spacer moiety may have a linear structure, in preferred embodiments of the invention as described herein, the spacer moiety may have a branched structure, such as a 4-armed star, 6-armed star or an 8-armed star. These types of spacer groups are widely-known in the field of polymer chemistry. The spacer is preferably not an amino acid or an amino acid sequence containing naturally-occurring amino acid residues. The length and molecular structure of each arm may be varied and controlled as appropriate in order to impart certain desired properties to an assembly obtained by reacting the poly-armed star with functionalized peptide bundles. The spacer moiety may also be a hydrocarbon or sugar moiety appropriately functionalized the click chemistry reactive functional groups for reacting with the peptide bundle termini, for example.

The spacer may also include an inorganic nanoparticle functionalized with the click chemistry reactive functional group as described herein. Representative examples of such a spacer are described below and shown in the Figures. Gold is a preferred component of the inorganic nanoparticle.

A particularly preferred spacer moiety is a 4-armed polyethylene glycol (PEG) molecule with thiol (—SH) end groups, i.e., a thiol functional group at the end of each arm of the polyethylene glycol). See FIGS. 19-21 for illustrations of this aspect of the invention. The thiol-functionalized PEG arms provide the opportunity for one PEG star to react with more than two peptide bundles. The resulting branching can produce stiff hydrogels with peptide bundle crosslink points and the ability to melt the structure by heating above the bundle melting temperature and then reform the structure upon cooling. In a preferred embodiment, the spacer moiety has a molecular weight of 5,000 to 50,000 g/mol. In another preferred embodiment, the spacer moiety is comprised of one or more polyoxyalkylene moieties, such as polyoxyethylene moieties The number of peptide bundles in the molecular assembly may vary widely based on the intended use thereof. The assembly of the present invention includes at least two peptide bundles that are covalently linked via the linker moiety. Thus, the assemblies may contain at least 2, 3, 5, 10, 25, 50, 100, 200, 250 or 500 peptide bundles. The upper limit of the number of peptide bundles is not particularly limited. Thus, the assemblies of the present invention may contain up to 5, 10, 25, 50, 100, 200, 250, 500, 1000, 2000 or more peptide bundles. Although the assemblies of the present invention are referred to as macromolecular assemblies, the use herein of the term "macromolecular" is not meant to imply or require that the assembly have a particularly high molecular weight, although such assemblies are within the scope of the present invention.

Macromolecular assemblies in accordance with certain aspects of the present invention may, for example, be represented by generic formula (I) or generic formula (II):

$$PB^1-[LM^1-PB^2]_n-LM^2-PB^3 \quad (I)$$

$$PB^1—(SM^1-PB^2]_n-SM^2-PB^3 \quad (II)$$

wherein $PB^1$, $PB^2$ and $PB^3$ are peptide bundles (which may be the same as or different from each other), $LM^1$ and $LM^2$ are linker moieties (which may be the same as or different from each other), $SM^1$ and $SM^2$ are linker moieties which also contain spacer moieties (which may be the same as or different from each other), and n is an integer of 0 to 2000 or more. Such macromolecular assemblies are linear in structure (one-dimensional). As described elsewhere herein, macromolecular assemblies in accordance with the invention may also be branched in structure and may be two-dimensional or three-dimensional, depending upon the chemistries used to construct the assemblies.

In preferred embodiments, at least one peptide bundle contains at least one amino acid residue that is functionalized with a polymer chain or a drug molecule, RNA molecule, another biofunctional peptide (e.g., ligand or antigen), polysaccharide, glycosaminoglycan, fluorescent dye, semiconductive organic molecule or inorganic nanoparticle. In a preferred embodiment, one or more of the peptides in the bundle may contain one or moew amino acid residues that are functionalized with a polymer chain. This type of structural motif is often referred to in the art as a "bottle-brush" design.

In a preferred embodiment, the assembly is in the form of a stiff fiber or a rigid rod. In addition, at the high concentrations associated often with materials assembly, the folding and structure of the assembly of the present invention is reversible upon cycling temperature and/or pH; the assembly does form amorphous aggregates in such circumstances.

As described in further detail below, the assembly of the present invention may be used as a component of a liquid crystal material. The assembly may also be used as a component of a fiber material.

As shown in FIG. 1, theory and computation are used to design sequences comprising natural and non-natural amino acids that fold to form helical coiled coil building blocks for nanomaterial construction. A tetrameric coiled coil, a representative building block in the present invention, is represented as a ribbon diagram highlighting the α-helical conformation of the four constituent peptides, and as a solid cylinder used in representations of different types of nanostructure to be explored. As illustrated on the right side of FIG. 1, the computationally designed coiled coil building blocks have desired chemical functionality displayed on the surface and interior for physical and/or covalent interaction. The constituent peptides can be antiparallel or parallel depending on the requirements of the coiled coil for nanomaterial formation. The peptides can be identical within a coiled coil (i.e., a homotetramer) or can be different (i.e., a heterotetramer). All coiled coil bundles can be designed in the context of a hierarchical physical and covalent assembly pathway to build 1-D, 2-D, or 3-D nanomaterials with desired structure and potential function as described herein.

Figure 2:
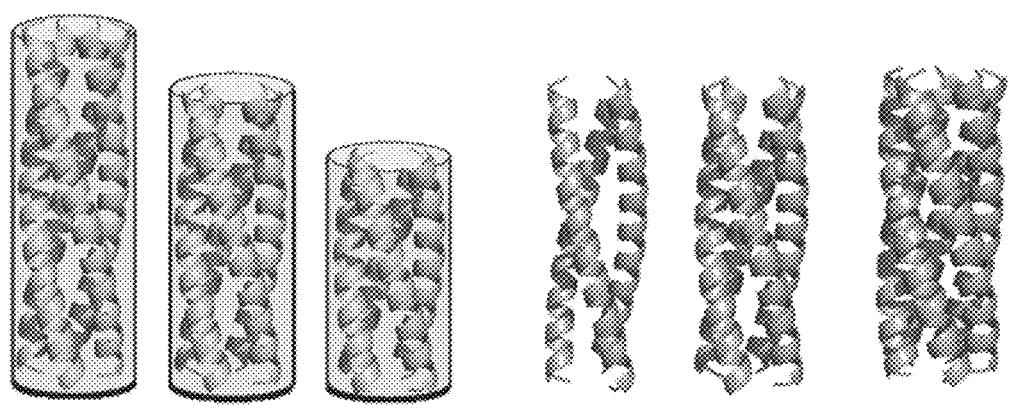
FIG. 2: Examples of computational design of peptide coiled coil bundles for use as building blocks for chains via click chemistry reactions are illustrated. The first three bundles are composed of homotetramers that have different lengths of the α-helix. The fourth, fifth and sixth bundles represent a homotrimer, homotetramer, and homopentamer, respectively providing for different bundle diameter and different magnitude of intrabundle interactions

FIG. 2 illustrates examples of computational design of peptide coiled coil bundles for use as building blocks for chains via click chemistry reactions. Computational design allows access to broad processing of the assemblies with variation of parameters such as pH, temperature, and concentration for reversible, controllable nanostructure formation in true materials processing fashion. Other design options include bundles with different constituent peptides (i.e. hetero bundles), antiparallel (alternating peptides flip within the bundle to mix N and C termini on one bundle end) vs. parallel bundles (all helices are head to tail in the same direction producing a polarized bundle), and the ability to connect the constituent α-helices in an antiparallel bundle with termini loops in order to create the same coiled coil bundle as individual peptides but with a single protein molecule. FIG. 2 shows examples of computational design allowing bundles of different lengths and size due to different peptide lengths and number of peptides, respectively.

Thus, the peptides in a bundle may be arranged in a parallel or antiparallel orientation and may be a homo structure, i.e., each peptide in the bundle has the same sequence, or a hetero structure, i.e., at least one peptide in the bundle has a different sequence than the other peptides in the bundle. The number of constituent peptides comprising the entire bundle may be at least 2 and up to 13, preferably no more than 4 and very preferably 4. Peptides are preferably at least 7 amino acids in length. Peptides may be up to 100 amino acids in length, for example. A peptide length of around 30 amino acids has been used in preferred embodiments of the invention.

Each amino acid may be a naturally occurring amino acid or any non-natural/synthetic amino acid. Thus, in preferred embodiments of the invention at least one constituent peptide or protein contains at least one non-natural amino acid with the non-natural amino acid containing functionality for covalent linking, for example.

Peptide bundles with an even number of peptides and that are antiparallel and have at least 2 peptides within the bundle exhibit dihedral symmetry. The dihedral symmetry has shown to produce the highly rigid assemblies as described herein.

Any peptide as described herein may be synthesized via common solid phase peptide synthesis (SPPS), solution phase synthesis, or recombinant biosynthesis. Any protein as described herein can be made with well-known recombinant molecular biology techniques.

An important aspect of the present invention is the fabrication of peptide-based structures to provide functional scaffolding of prescribed geometries and size. The computational design of non-biological peptide and proteins for assembly of desired structures is now accessible with statistical mechanical theoretical methods that have yielded peptides with experimentally determined structures and functions in close agreement with designs found in nature. These multiscale methods provide tools for addressing the design of non-biological, peptide-derived assemblies. Large ensembles of candidate structures and peptide sequences can be generated and explored prior to experiment. Initial building blocks comprising helical bundles of peptides can be computationally-generated using techniques well-known in the art. These multistranded (e.g. dimeric, trimeric, and tetrameric) coiled coils may comprise peptides that have been identified from ensembles of bundle structures, which are generated by varying a few geometric parameters that specify the structure of the bundle, such as superhelical radius, pitch, and helical rotation.

Figure 3:
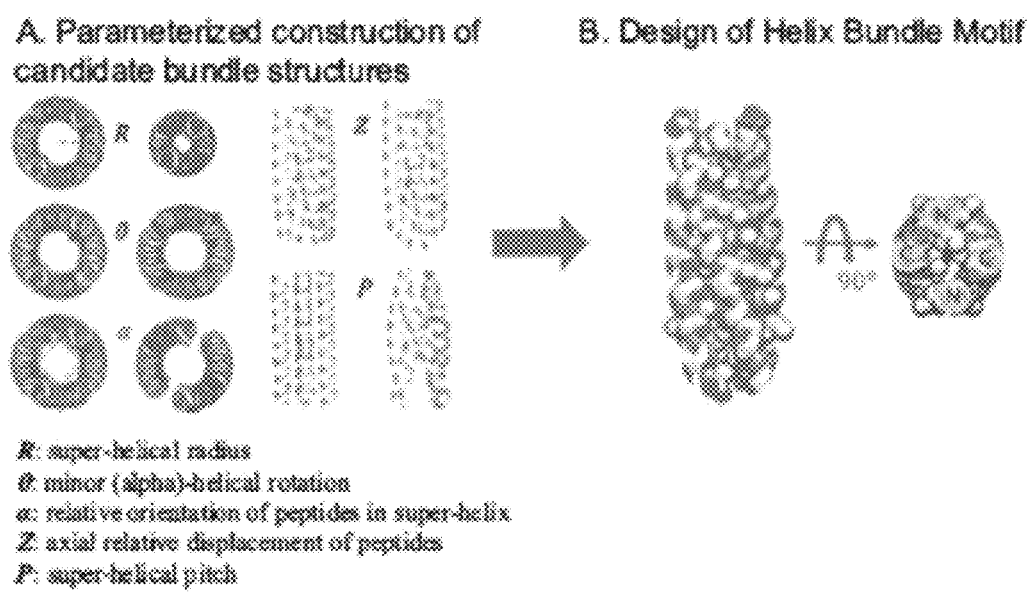
FIG. 3: Designs of helical bundle structures are illustrated. Bundle structures may be parameterized using a small number of geometric quantities (A). These may be systematically varied. Design and modeling of sequence can be applied to each such structure. Structures can be accessed based on their energies to identify those that present complementary interior intermolecular interactions (B).

This approach allows de novo generation of large numbers of candidate bundle structures, which subsequently can be assessed energetically and with regard to their sequence and structure complementarity as shown in FIG. 3 and suitability for presenting nonbiological amino acids and linking chemistries. The relative positioning of bundles, as well as their bundle structures, can be varied in searches for those relative bundle orientations that support a given set of covalent "click" cross-link structures. As needed, suitable exterior amino acids may be identified using computational design in the context of prespecified target assemblies (e.g. desired physical interactions and desired display of functional groups for covalent interaction). Candidate structures may be assessed quantitatively using scoring functions that assess (a) the noncovalent intermolecular energetic interactions (e.g., using molecular force fields) and (b) the extent to which local structures and orientations of functional groups are geometrically consistent with a given "click" reaction product.

An example of helical bundle design is shown in FIG. 3. Bundle structure may be parameterized using a small number of geometric quantities (A). These may be systematically varied. Design and modeling of sequence can be applied to each such structure. Structures may be accessed based on their energies to identify those that present complementary interior intermolecular interactions (B).

Figure 4:
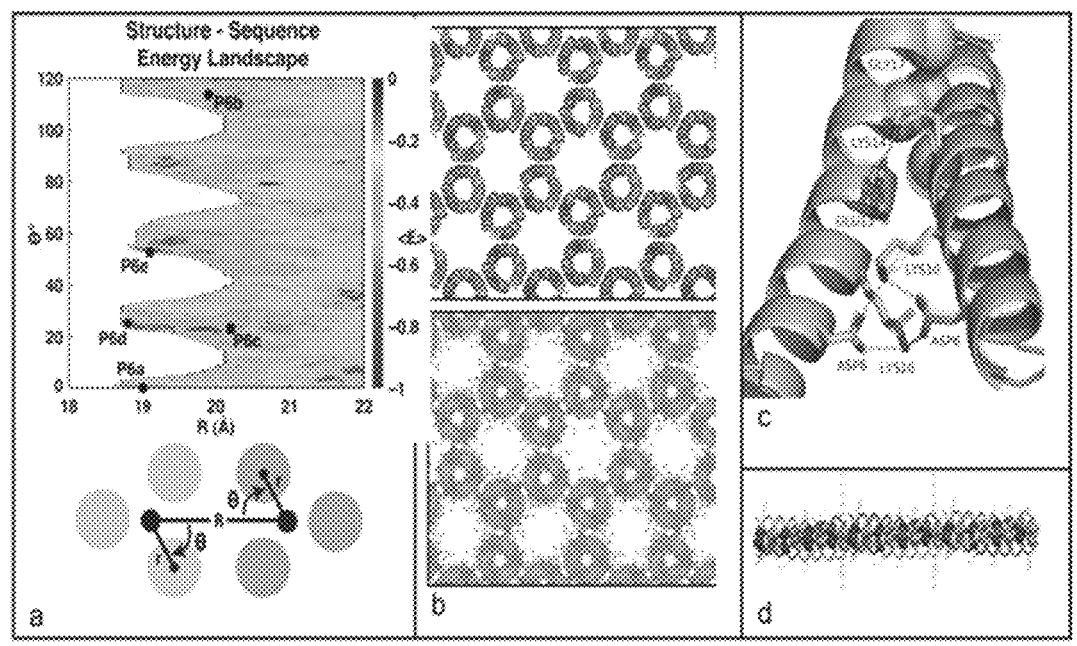
FIG. 4: Illustration of computational design of protein crystal with P6 symmetry is illustrated. (A) Energy landscape associated with two degrees of freedom (R, B) that specify the distance and orientation of neighboring proteins in the P6 crystal. Energy is average over sequences compatible with crystalline configuration specified by R and B. Experimentally studied sequences are indicated. (B) One layer of model P6 structure for protein P6d; (upper) model and (lower) electron density from x-ray crystallographic structure derived from 0.2 mm crystal. (C) Superposition of adjacent proteins within the crystal: computational model structure and crystallographically determined structure. (D) Structure of three three-helix bundles in three different layers reveals pseudo contiguous hydrophobic core. The bundles illustrated in this Figure may be used in the assembly of the present invention when functionalized with the click chemistry reactive chemical groups described herein.

FIG. 4 shows the computational design of a protein crystal with P6 symmetry. The approach designs the crystalline structure and ordering via the design of 18/26 exterior amino acids of each helix. (a) Energy landscape associated with two degrees of freedom (R, B) that specify the distance and orientation of neighboring proteins in the P6 crystal. Energy is average over sequences compatible with crystalline configuration specified by R and 8. Experimentally studied sequences are indicated. (b) One layer of model P6 structure for protein P6d; (upper) model and (lower) electron density from x-ray crystallographic structure derived from 0.2 mm crystal. (c) Superposition of adjacent proteins within the crystal: computational model structure and crystallographically determined structure. (d) Structure of three three-helix bundles in three different layers reveals pseudo contiguous hydrophobic core.

Figure 5:
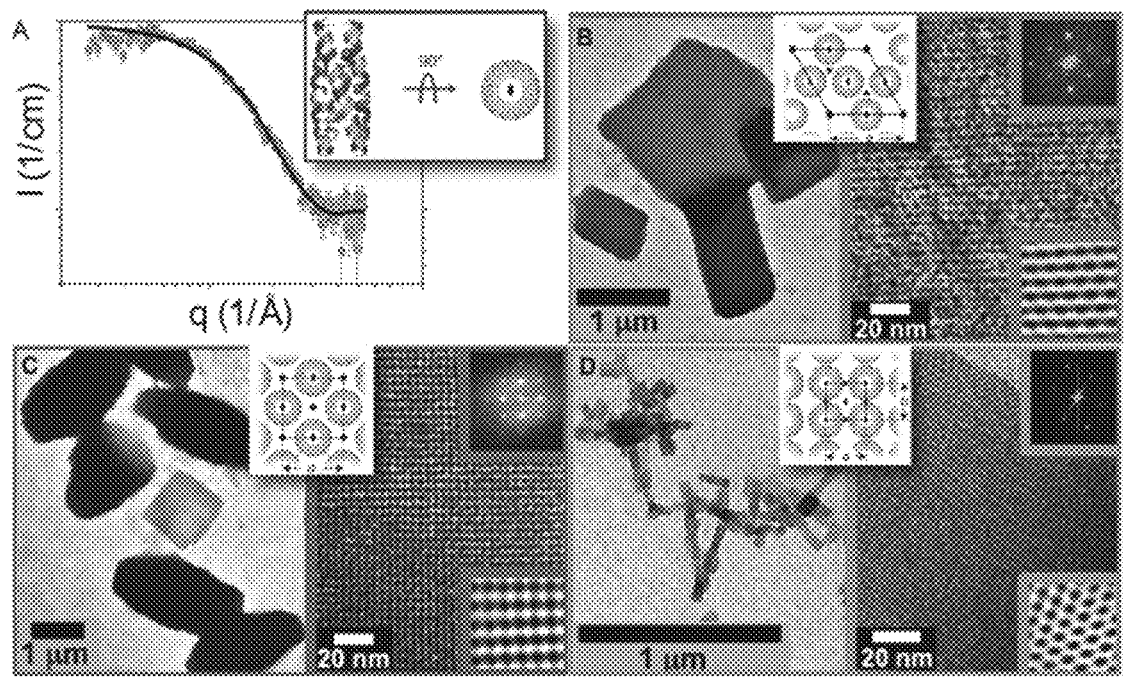
FIG. 5: Illustration of computationally designed and experimentally verified coiled coil assemblies. Sequences are 29 amino acid residues in length. Sequences are designed to form a helical homotetramer and to exhibit distinct behaviors and types of assembly. The hydrophobic interior is conserved and only the exterior sequence of each bundle varies for the distinct peptides presented in panels A-D. (A) Sequence designed to form a homotetramer that does not further self-associate nor form lattice assemblies. Fit to neutron scattering data reveals a cylinder length (3.5 nm) and diameter (2.0 nm) consistent with the dimensions of tetrameric coiled coil design (Inset: Ribbon rendering and projection down the $C_2$ axis of the coiled coil bundle). (B), (C), and (D)) Three sequences designed to form homotetramers and self-associate into lattices with well defined symmetry: P622, P422, and P222 space group symmetries, respectively. Transmission electron microscopy (TEM) images (left image: low mag/right image: hi-mag TEM) are consistent with local symmetry used in the design (inset), as confirmed in panels (B), (C), and (D) by 2-dimensional Fourier transform (upper right) and filtered inverse Fourier transform (lower right). The bundles illustrated in this Figure may be used in the assembly of the present invention when functionalized with the click chemistry reactive chemical groups described herein.

FIG. 5 illustrates the computational design and experimental characterization of an exemplary coiled coil assembly. Each peptide component of the coiled coil assembly has a length of 29 amino acid residues and are designed to form a homotetramer.

The peptide bundles may be connected via the linker moiety using a wide variety of click chemistry reactions, which are well-known in the art. The linker moiety comprises a reaction product of complementary click chemistry reactive functional groups on the peptide bundles covalently linked by the linker moiety. In a preferred embodiment, at least one of the complementary click chemistry reactive functional groups is at the N- or C-terminus of a peptide bundle. In another embodiment, at least one of the complementary click chemistry reactive functional groups is on a side chain of an amino acid of a peptide bundle. In another embodiment, the linker moiety comprises the reaction product of a click chemistry reactant on a peptide bundle and a complementary click chemistry reactant on a spacer moiety.

Examples of pairs of complementary click chemistry reactive functional groups that can be employed in the practice of the present invention include, but are not limited to:

thiol+alkene
thiol+(meth)acrylate
thiol+alkyne
thiol+vinyl ether
thiol+maleimide
azide+alkyne
furyl+maleimide (Diels-Alder cycloaddition)
oxyamino (—O—$NH_2$)+aldehyde
amine+(meth)acrylate
amine+maleimide
silyl ether+sulfonyl fluoride As is well known in the art, the complementary click chemistry reactive functional groups may be selected such that the reactive functional groups react readily with each other, even at, for example, mild conditions (e.g., around room temperature, in an aqueous medium) and in the absence of an initiator or catalyst. However, the rate of reaction may be promoted through the use of initiators (e.g., free radical initiators), catalysts (e.g., basic catalysts, metal-containing catalysts) and higher reaction temperatures, as is also well-known in the art.

Figure 22:
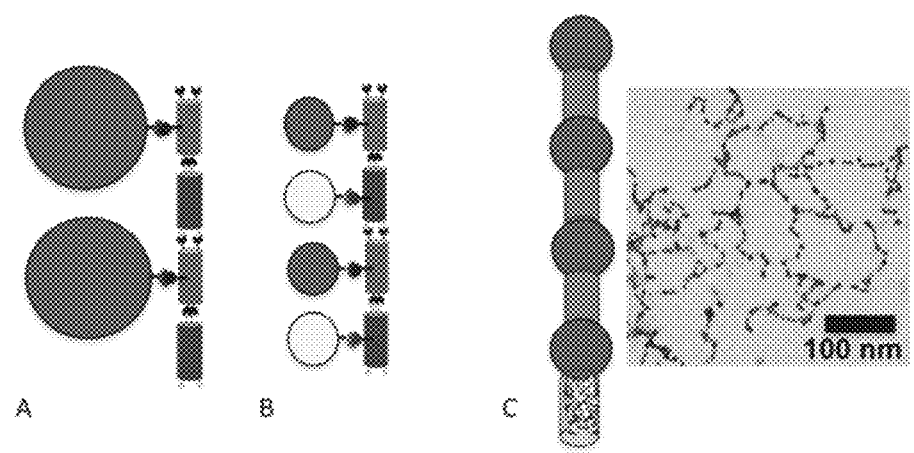
FIG. 22: Examples of 1-D templated assembly of inorganic particles. (A) and (B): Side chain chemistry on a polymer made from designed bundles can be used for specific nanoparticle covalent attachment, controlling the spacing between and type of particle attached. (C): Example of using inorganic particle as part of 1-D chain backbone where peptide bundles alternate with inorganic particles through covalent attachment. TEM image of such an assembly reveals a loose network of gold nanoparticles alternating with antiparallel homotetramer coiled coils through click reactions (e.g., thiols at N-termini of the peptides with thiol acceptor-functionalized gold nanoparticles).

The nature of the spacer moiety may vary widely, depending on the desired properties of the assembly. For example, the spacer moiety may be derived from pentaerythritol tetra(3-mercaptopropionate) (PETMP), i.e., the spacer moiety may be PETMP in which the thiol groups are deprotonated and the sulfur atoms covalently bonded to carbon atoms in the assembly. In another embodiment, the spacer moiety comprises at least one polyethylene glycol moiety. In another embodiment, the spacer moiety comprises at least four polyethylene glycol moieties. In another embodiment, the spacer moiety may be an inorganic particle functionalized with a click-chemistry reactive group. An example of such an assembly is shown in FIG. 22, discussed below.

Figure 6:
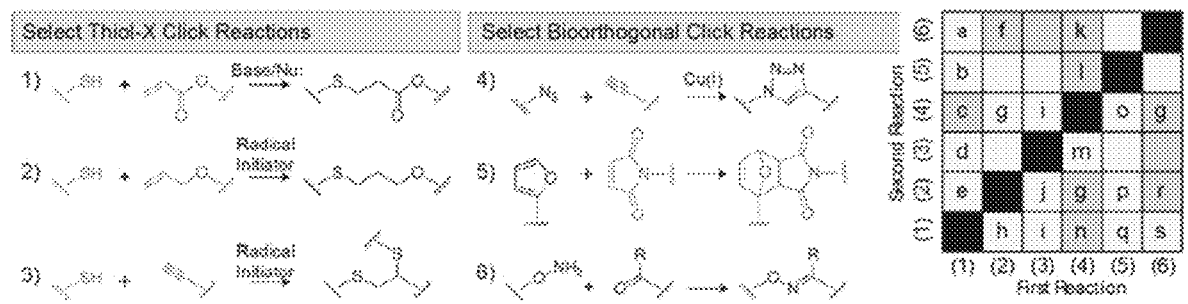
FIG. 6: Click-chemistry reactions that may be used in the present invention are illustrated. Complementary reactive functional groups are shown.

As discussed above, the 'click chemistry' used to connect peptide bundles as described herein is well-known and widely-used in the field of protein design. FIG. 6 illustrates representative click chemistry reactions that may be used to synthesize the assemblies of the present invention. Reaction 1-3 are thiol-X reactions, which harness the unique thiolate/thiyl reactivity to produce a rapid and high yielding reaction, where highlighted functional groups exemplify (1) the base or nucleophile catalyzed thiol-Michael addition, (2) the radical mediated thiol-ene reaction, and (3) the radical mediated thiol-yne reaction. Owing to the presence of thiol in biological systems (in particular, the amino acid, cysteine) these reactions are not considered bio-orthogonal, in contrast to reactions 4-6. As a bioconjugation strategy, it may be preferable to not include cysteine in the peptide sequence unless the thiol group is protected (after cleavage from the resin in SPPS) or use it as a conjugation point. Here, functional groups are highlighted that exemplify (4) the copper catalyzed azide-alkyne cycloaddition (CuAAC), (5) the Diels-Alder (DA) cycloaddition, and (6) the formation of an oxime bond. The reaction table indicates whether the reaction can be performed sequentially, where darker shading indicates a wide range of feasible reaction conditions and lighter shading indicates a feasible reaction under a narrow set of conditions.

The incorporation of non-biological 'click' amino acids is relatively straightforward through the use of solid-phase peptide synthesis (SPPS). For example, Fmoc-based microwave-assisted SPPS techniques may be employed to rapidly make a range of peptide materials. The most direct route is to modify the peptide end-groups. Particularly preferred embodiments include commercially available cysteine (thiol functional monomer) and alloc-protected lysine (vinyl functional monomer) as thiol-ene click conjugates. Additionally, there are a number of commercially available azide and alkyne functional amino acids (Aldrich, ChemImpex, etc.) for the CuAAC reaction. These two orthogonal reaction conjugates can provide the initial framework for bundle crosslinking and functionalization.

Figure 7:
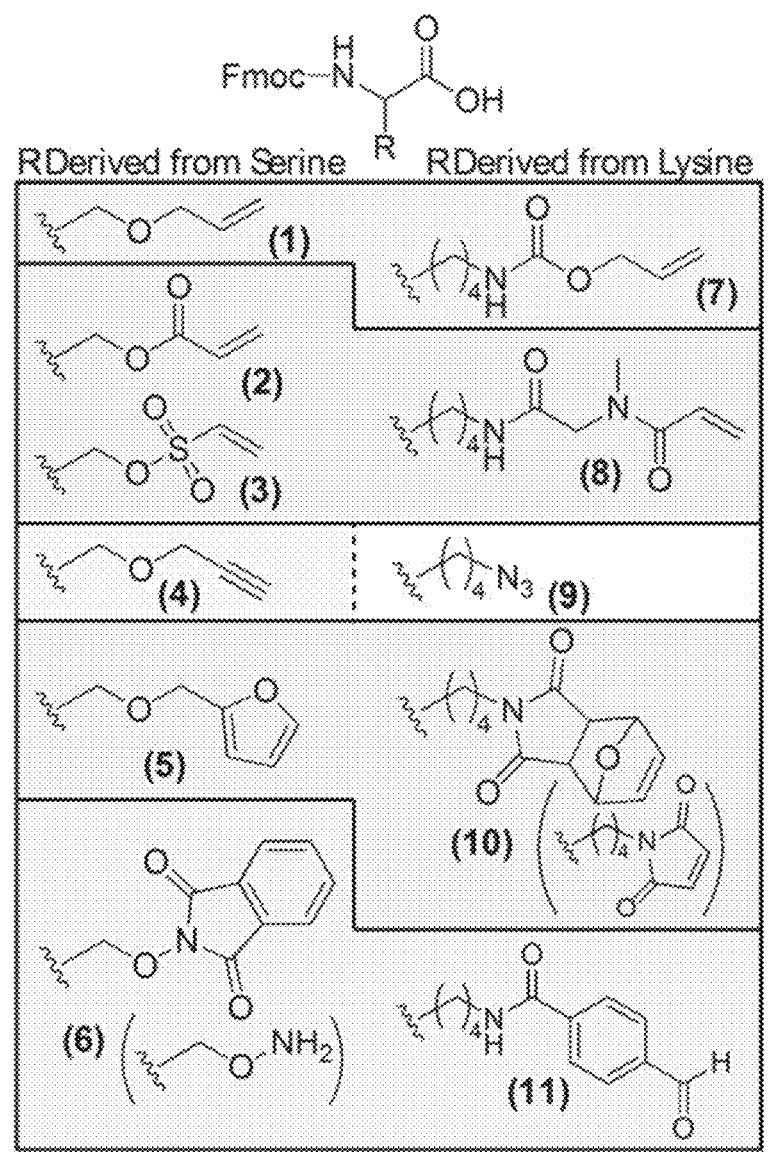
FIG. 7: Click amino acid candidates based on modification of serine and lysine are illustrated. The two structures shown in parentheses are the target functional groups after deprotection.

Additionally, non-commercially available amino acids may be synthesized to enable greater flexibility in side group characteristics and, thus, bundle design. The actual monomer structures can be determined via computational guidance and can involve an iterative optimization approach that weights the benefit of chemical modification against what is synthetically practical. The initial practical set of click amino acids can be based on natural amino acids as the synthon. For example, 11 click amino acids can be synthesized from serine or lysine starting materials, as shown in FIG. 7. Synthesis of these amino acids follow simple chemical transformations using well-known procedure in the art.

Figure 8:
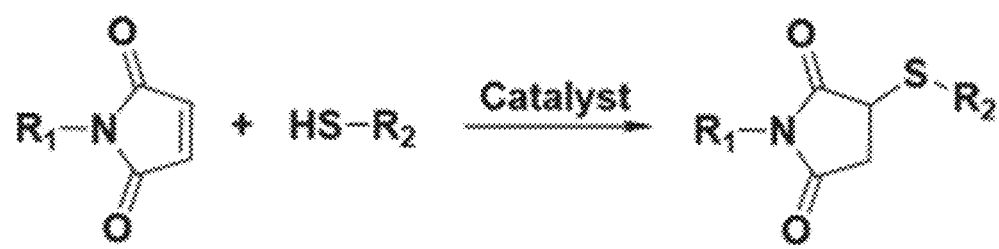
FIG. 8: An example of click chemistry to couple two peptide bundles is illustrated. This scheme illustrates a thiol-Michael reaction to create the linker moiety between assembly components R1 and R2.
Figure 9:
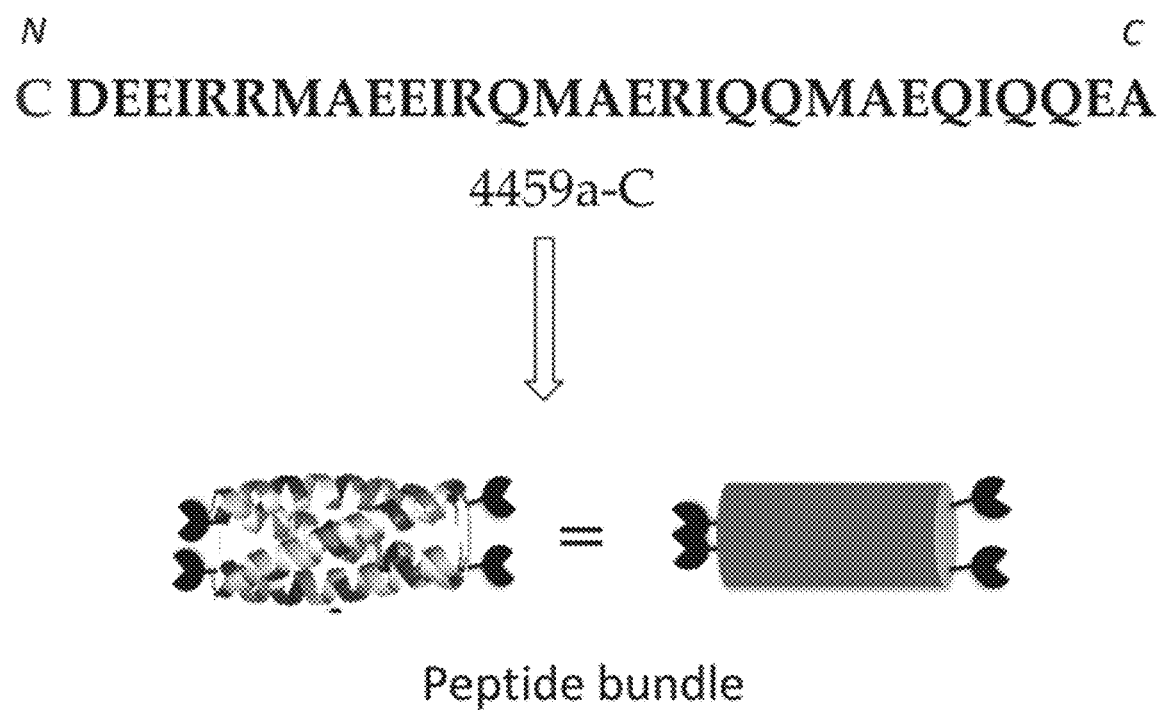
FIG. 9: A Cys-functionalized peptide bundle formed by peptide 4459a-C(SEQ ID NO: 1), in which the —SH group is the reactive functional group.
Figure 10:
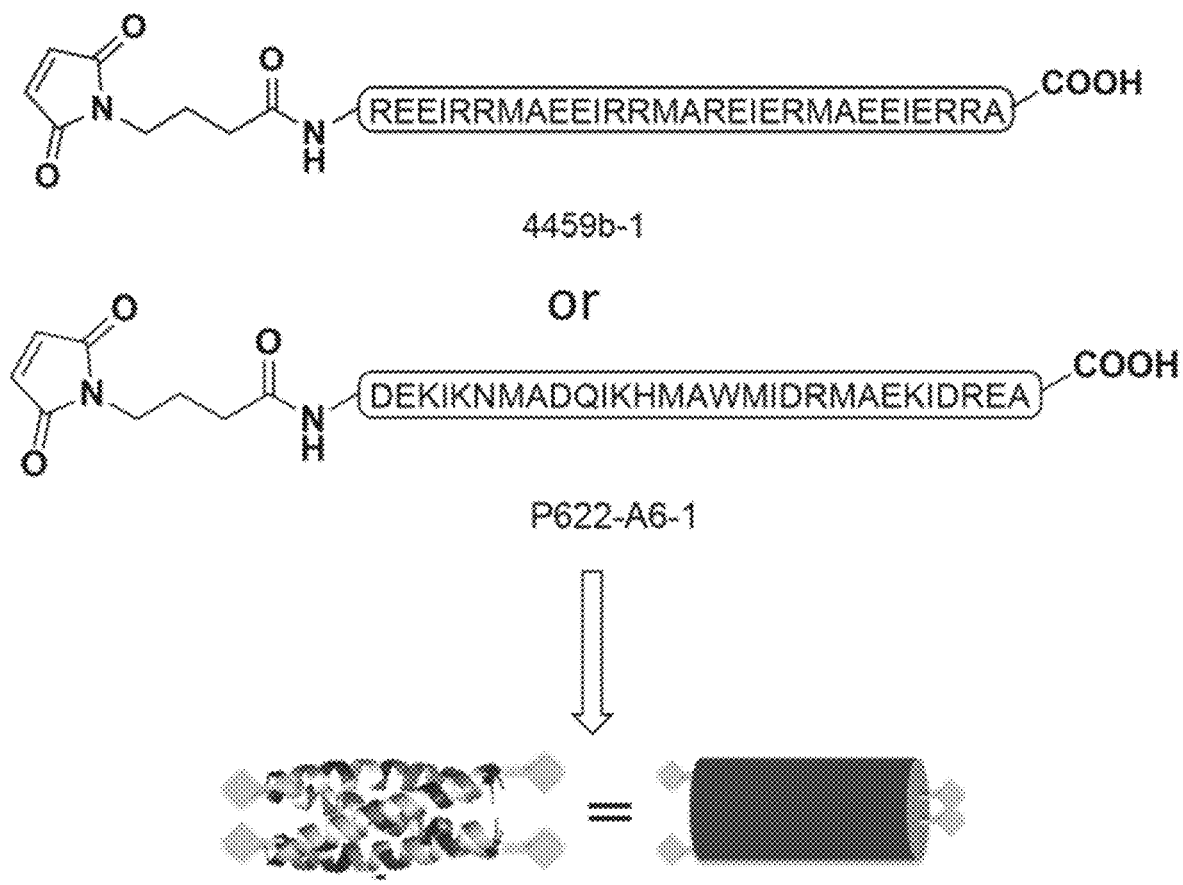
FIG. 10: Peptides functionalized with a maleimide group, which is an example of a click chemistry reactive functional group, and assembled into a helical coiled coil peptide bundle formed by peptide 4459b-1 (SEQ ID NO: 2) and peptide P622-A6-1 (SEQ ID NO: 3).
Figure 11:
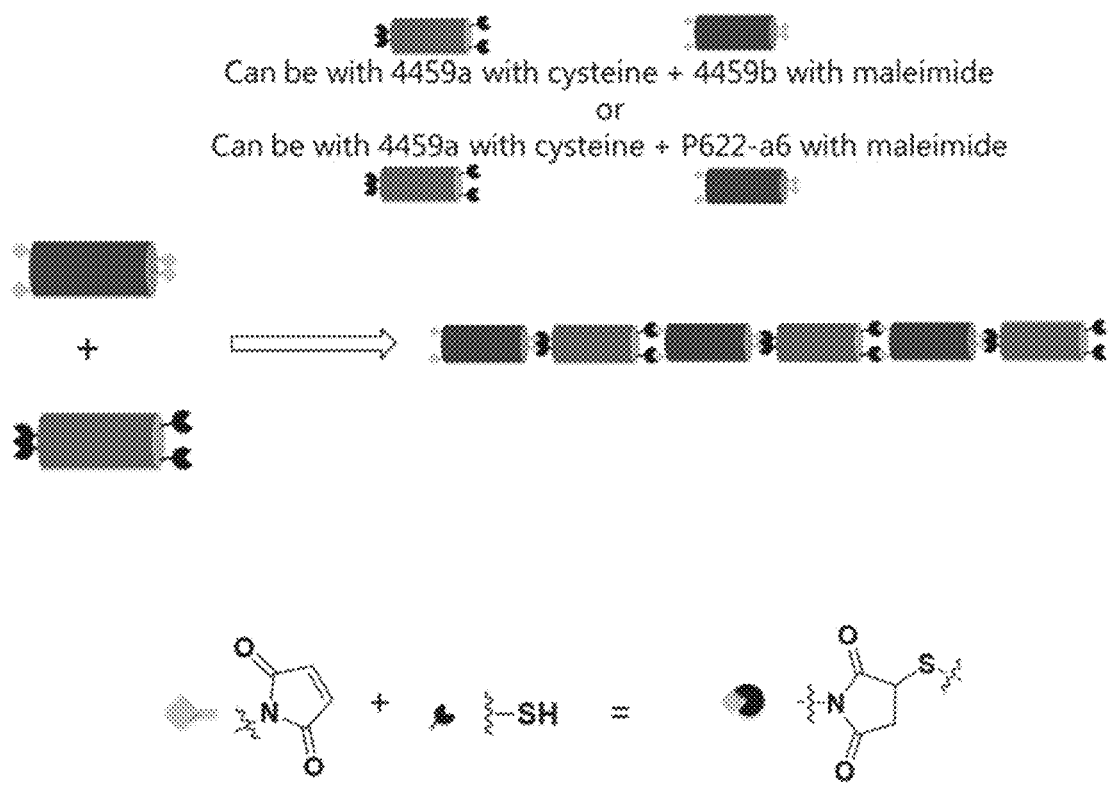
FIG. 11: The coupling of the complementary peptide bundles shown in FIGS. 9 and 10 to form an assembly of the present invention.

FIGS. 8-11 illustrate coupling of assembly components. An example of click chemistry to couple two peptide bundles is shown in FIG. 8. This figure illustrates a thiol-Michael reaction to create the linker moiety between assembly components R1 and R2. For example, R1 and R2 may be each be a peptide bundle. Alternatively, one or both of these components may include a spacer moiety. FIG. 9 illustrates a Cys-functionalized peptide bundle in which the —SH group is the reactive moiety. FIG. 10 illustrates peptides functionalized with a maleimide group, which is an example of a reactive moiety which is complementary to the —SH group of the Cys-functionalized peptide bundle. FIG. 11 illustrates the coupling of the complementary peptide bundles shown in FIGS. 9 and 10 to link the bundles via a linker moiety.

Figure 12:
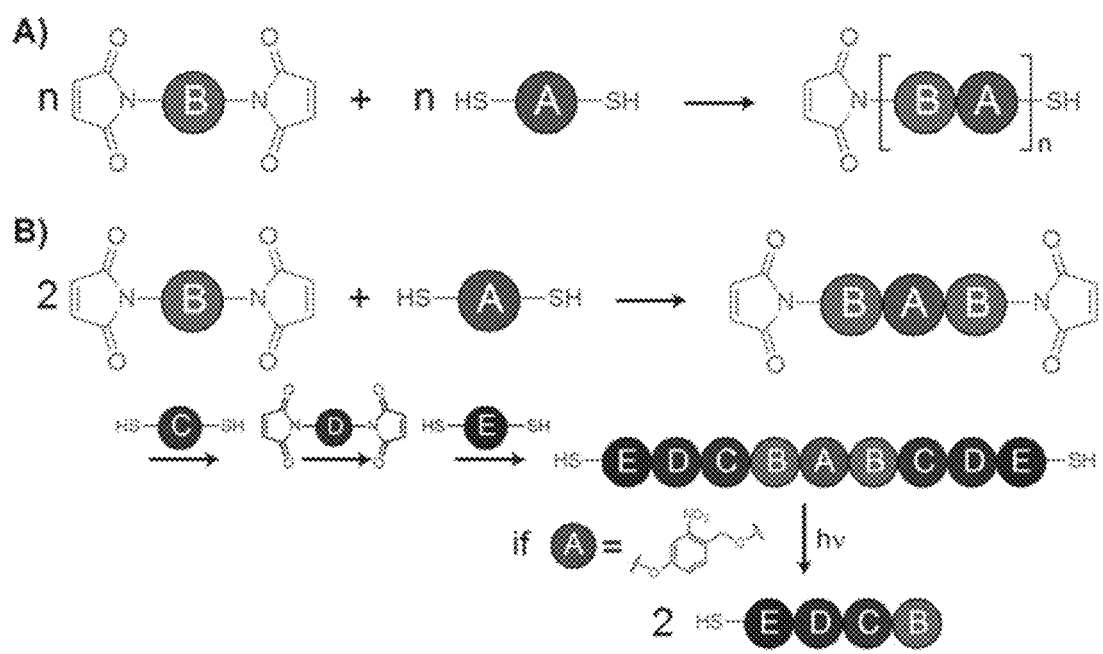
FIG. 12: Examples of two different symmetric step-wise synthetic routes to produce the assembly. (A) Reaction of stoichiometric amounts of difunctional maleimide bundles with difunctional thiol bundles produces a periodic polymer sequence. (B) Using large excess of one bundle (in this case the difunctional maleimide) with the difunctional thiol bundle yields a trimer of bundles. After purification, a large excess of a difunctional thiol bundle could be reacted to each end. This process can be repeated to achieve an arbitrary bundle sequence. Finally, if monomer A is a photodegradable group, rather than a bundle, then a non-symmetric bundle sequence is produced via irradiation.
Figure 13:
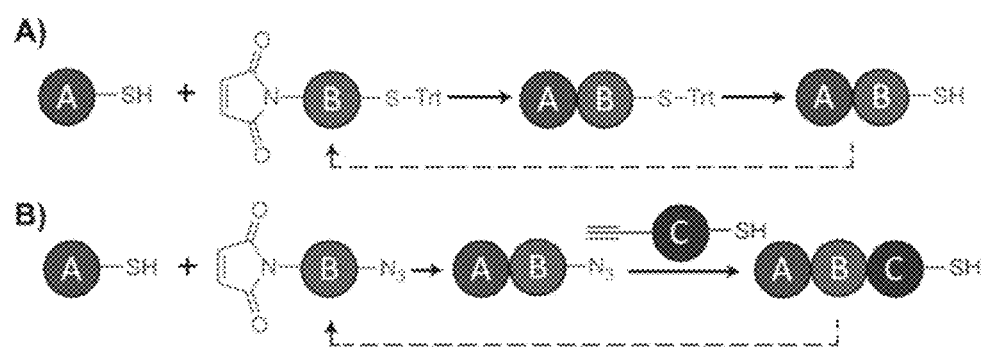
FIG. 13: Examples of two different asymmetric step-wise synthetic routes to produce the assembly. (A) Reaction of a monofunctional thiol bundle with a bundle possessing maleimide functionality on one end and a thiol protected functionality on the other. After purification, the thiol is deprotected and can be reacted with another maleimide/thiol protected bundle to build the sequence. (B) As an alternative to using a protecting group, subsequent additions with orthogonal reactivity can be performed. As shown, a reaction of a monofunctional thiol with a maleimide/azide bundle produces an azide end-functionalized dimer of bundles, which can then be reacted with an alkyne/thiol bundle. The thiol product can then be reacted with another maleimide/azide bundle to construct the assembly.

FIGS. 12 and 13 illustrate examples of symmetric and asymmetric step-wise synthesis, respectively. FIG. 12 illustrates examples of two different symmetric step-wise synthetic routes. Panel (A) illustrates the reaction of stoichiometric amounts of difunctional maleimide bundles with difunctional thiol bundles produces a periodic polymer sequence. Panel (B) illustrates that using a large excess of one bundle (in this case the difunctional maleimide) with the difunctional thiol bundle yields a trimer of bundles. After purification, a large excess of a difunctional thiol bundle could be reacted to each end. This process can be repeated to achieve an arbitrary bundle sequence. Finally, if monomer A is a photodegradable group, rather than a bundle, then a non-symmetric bundle sequence is produced via irradiation.

FIG. 13 illustrates examples of two different asymmetric step-wise synthetic routes. Panel (A) illustrates reaction of a monofunctional thiol bundle with a bundle possessing maleimide functionality on one end and a thiol protected functionality on the other. After purification, the thiol is deprotected and can be reacted with another maleimide/thiol protected bundle to build the sequence. In panel (B), alternatively to using a protecting group, subsequent additions with orthogonal reactivity can be performed. As shown, a reaction of a monofunctional thiol with a maleimide/azide bundle produces an azide end-functionalized dimer of bundles, which can then be reacted with an alkyne/thiol bundle. The thiol product can then be reacted with another maleimide/azide bundle to covalently link the peptide bundles.

Figure 14:
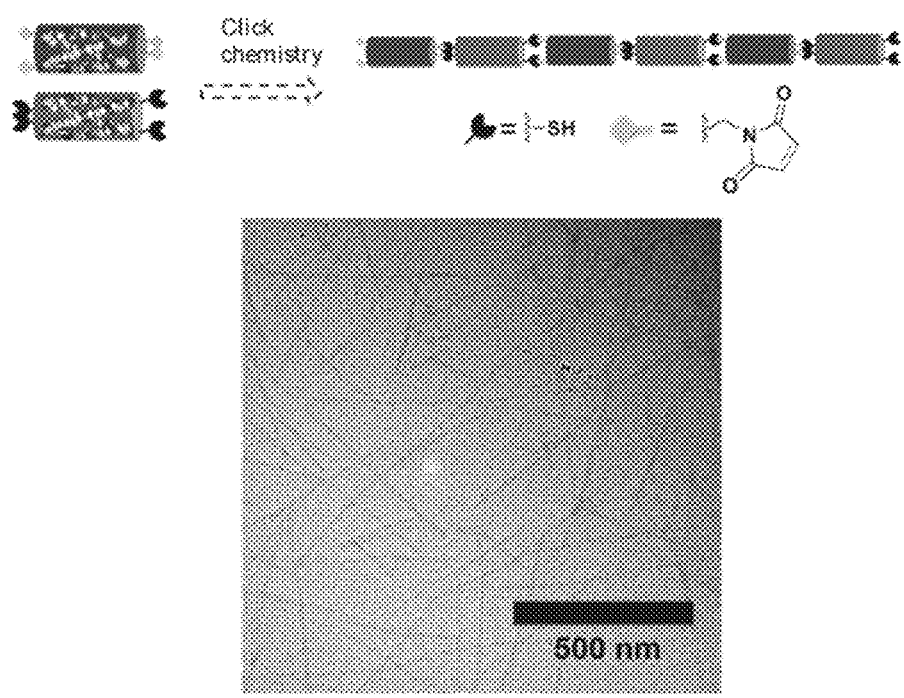
FIG. 14: Covalent assembly of homotetrameric peptide bundles using a thiol and maleimide as complementary reactive functional groups. The cryoTEM image shows ultra-rigid rod polymers formed. Similar chains of bundles are formed after raising the temperature above the melting temperature of the bundles, where the polymers dissolve, and a subsequent temperature quench where the bundles reform and consequently reform the rigid rod polymers.

FIG. 14 illustrates covalent assembly of homotetrameric peptide bundles using a thiol and maleimide. The cryoTEM image shows ultra-rigid rod polymers formed. Similar chains of bundles are formed after raising the temperature above the melting temperature of the bundles, where the peptide structure "melts" (i.e., the helical structure is lost) and a subsequent temperature quench where the bundles reform and consequently reform the rigid rod polymers with helical structure.

Figure 15:
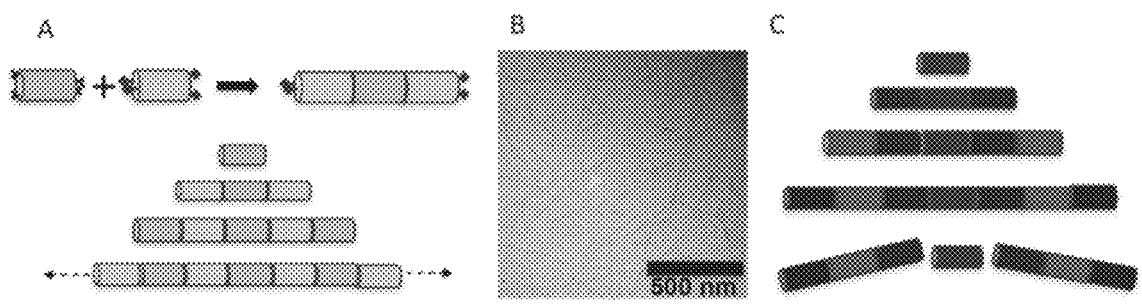
FIG. 15: Examples of assemblies containing helical bundles (supermonomers) based on peptide computational design and non-natural amino acids. (A) Polymers with extreme stiffness (large persistence length) due to the stiffness of the peptide bundle building blocks and the rigid, restricted linkages between supermonomers. Building blocks are functionalized with complementary reactive cross-linking groups. (B) CryoTEM image from polymerization of homotetrameric bundles. Each bundle is comprised of four identical 29-residue peptide sequences. Two distinct homotetramers, as in (A), are created by modification of the N-terminus: one bundle comprises peptides with an additional N-terminal cysteine (thiol group); the other bundle has maleimide groups at the N-termini of its constituent peptides. These form interbundle covalent connections between nm-scale bundle supermonomers. Notice the rigid rod-like character over 100s of nm through microns observed among these the polymer chains. (C) One can react in a serial, hierarchical manner to build up symmetric heteropolymers of peptide bundles.

FIG. 15 illustrates examples of assemblies containing helical bundles (supermonomers) based on peptide computational design and non-natural amino acids. In panel (A), polymers with extreme stiffness (large persistence length) due to the stiffness of the peptide bundle building blocks and the rigid, restricted linkages between supermonomers. Building blocks are functionalized with complementary reactive cross-linking groups. Panel (B) illustrates a CryoTEM image from polymerization of homotetrameric bundles. Each bundle is comprised of four identical 29-residue peptide sequences. Two distinct homotetramers, as in panel (A), are created by modification of the N-terminus: one bundle comprises peptides with an additional N-terminal cysteine (thiol group); the other bundle has maleimide groups at the N-termini of its constituent peptides. These form interbundle covalent connections between nm-scale bundle supermonomers. Notice the rigid rod-like character over lengths of hundreds of nanometers through microns that is observed among these the polymer chains. As shown in panel (C), one can react in a serial, hierarchical manner to build up symmetric heteropolymers of peptide bundles. Through control of bundle peptide sequence, linking chemistry, and purification, polymers with desired length and sequence of supermonomers can be created to form rigid-rod chains. With control of stoichiometry during covalent connection, as well as ease of separation of molecule species after connection, one can build specific lengths of chain or simply polymerize the bundles into long chains with less control of eventual molecular weight but retention of rigid-rod properties. If selected covalent connections are reversible, fragmentation can yield sequences of desired length and sequence; one example is illustrated, where the linkages to the central parent super-monomer are cleaved to produce two asymmetric rods from the parent symmetric rod.

Figure 16:
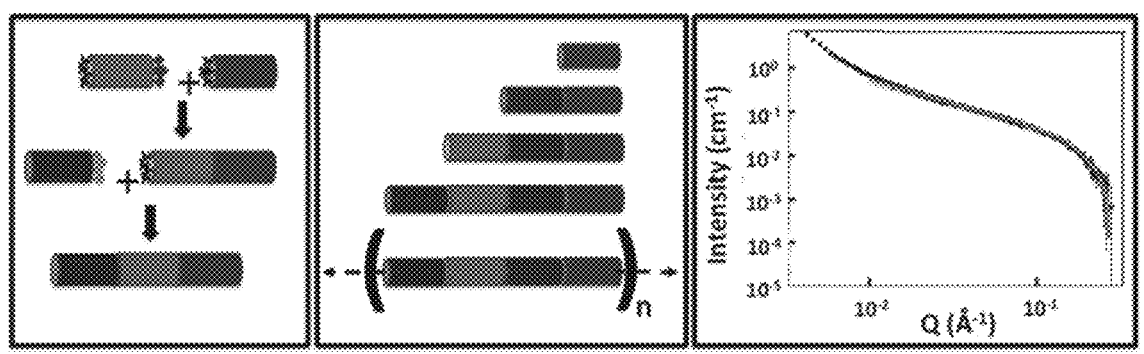
FIG. 16: Examples of assemblies with parallel peptide coiled coil bundles. Left: Tetrameric peptide bundles connected in specific, hierarchical fashion with sequential covalent click chemistry reactions to build asymmetric rod polymers. Middle: With proper choice of click chemistry, one can build a desired length and molecular weight of rod including the use of a subsequence of bundles as a supermonomer to produce polymeric materials with exactly defined chain segments or large polymers with desired, specific bundle sequence as a super monomer. Right: Small-angle neutron scattering of 1 mM solution of a large polymer of bundle segments as shown schematically at the bottom of the middle panel. The curve is a fit to the data considering a rigid rod cylinder of approximately 1.5 nm in diameter and a length of greater than 600 nm. The rigid rod polymer length is longer that can be accurately measured with the SANS technique exclusively due to an increase in intensity at the lowest Q values due to interpolymer interactions.

FIG. 16 illustrates examples of exotic polymers possible with parallel peptide coiled coil bundles. The left panel illustrates tetrameric peptide bundles connected in specific, hierarchical fashion with sequential covalent click chemistry reactions to build asymmetric rod polymers. The middle panel illustrates that with proper choice of click chemistry, one can build a desired length and molecular weight of rod including the use of a subsequence of bundles as a supermonomer to produce polymeric materials with exactly defined chain segments or large polymers with desired, specific bundle sequence as a super monomer. Right: Small-angle neutron scattering of 1 mM solution of a large polymer of bundle segments as shown schematically at the bottom of the middle panel. The curve is a fit to the data considering a rigid rod cylinder of –1.5 nm in diameter and a length of greater than 600 nm. The rigid rod polymer length is longer that can be accurately measured with the SANS technique exclusively due to an increase in intensity at the lowest Q values due to interpolymer interactions.

Figure 17:
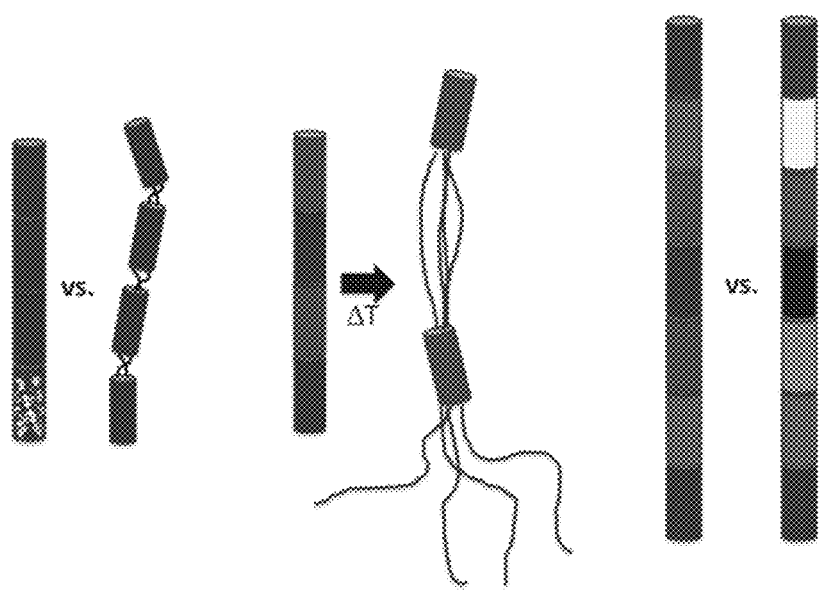
FIG. 17: Schematic examples of chains made possible via peptide bundle design and connection. Left: rigid rod vs semiflexible or flexible chains depending on choice of linking chemistry between tetrameric bundles. Middle: copolymers of tetrameric bundles that can be altered between rigid rod and flexible chains via melting transitions of constituent peptide bundles. Right: complex chain sequences to produce chains of exact length and desired bundle sequence through peptide bundle design and proper choice of covalent interactions between bundles.

FIG. 17 illustrates schematic examples of chains made possible via peptide bundle design and connection. The left panel illustrates rigid rod vs semiflexible or flexible chains depending on choice of linking chemistry between tetrameric bundles. Middle: copolymers of tetrameric bundles that can be altered between rigid rod and flexible chains via melting transitions of constituent peptide bundles. The right panel illustrates complex chain sequences to produce chains of exact length and desired bundle sequence through peptide bundle design and proper choice of covalent interactions between bundles. The chains can be symmetric or asymmetric.

Figure 18:
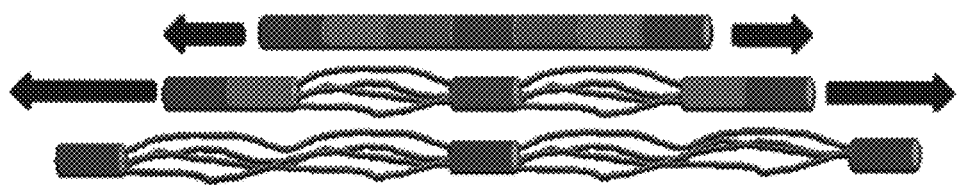
FIG. 18: Potential mechanical response of bundle chain, extreme elongation is possible with end to end covalent attachment of all α-helices within individual bundles. Different colored bundles represent different intrabundle interactions possible making some stronger relative to tension forces. Each peptide can elongate 150% or more of its original length on uncoiling.

FIG. 18 illustrates the potential mechanical response of a bundle chain. Extreme elongation is possible with end to end covalent attachment of all α-helices within individual bundles. Different bundle shading in the Figure represents different intrabundle interactions possible making some stronger relative to tension forces. Each helix can elongate up to ~150% of its original length on uncoiling. Interactions laterally between bundles can be specifically designed through computation for additional strength/stiffness.

Figure 19:
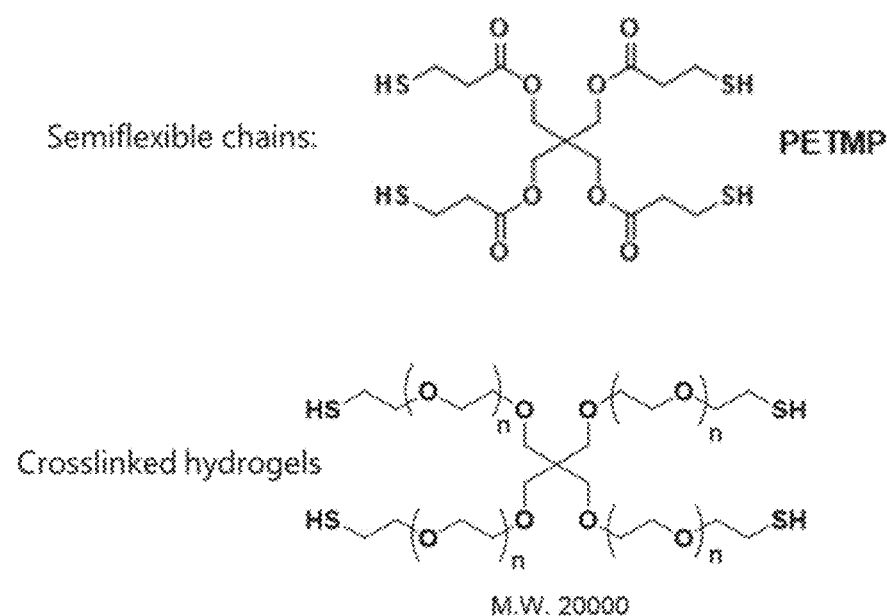
FIG. 19: Representative examples of spacer moieties useful in the present invention.

FIG. 19 provides the chemical structure of representative examples of spacer moieties useful in the present invention. These are only examples and a wide variety of moieties having similar structure may be used. Of course, the spacer moieties are functionalized with click chemistry reactive groups that can couple with the intended reactant.

Figure 20:
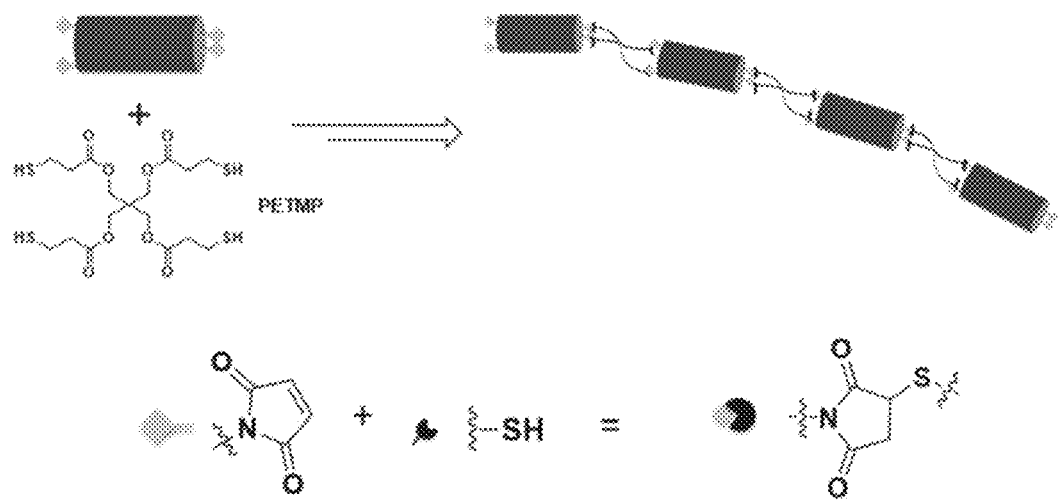
FIG. 20: Assembly produced using a spacer moiety and click chemistry as described herein that has semi-flexible chains.

FIG. 20 illustrates an assembly produced using a spacer moiety and click chemistry as described herein.

Figure 21:
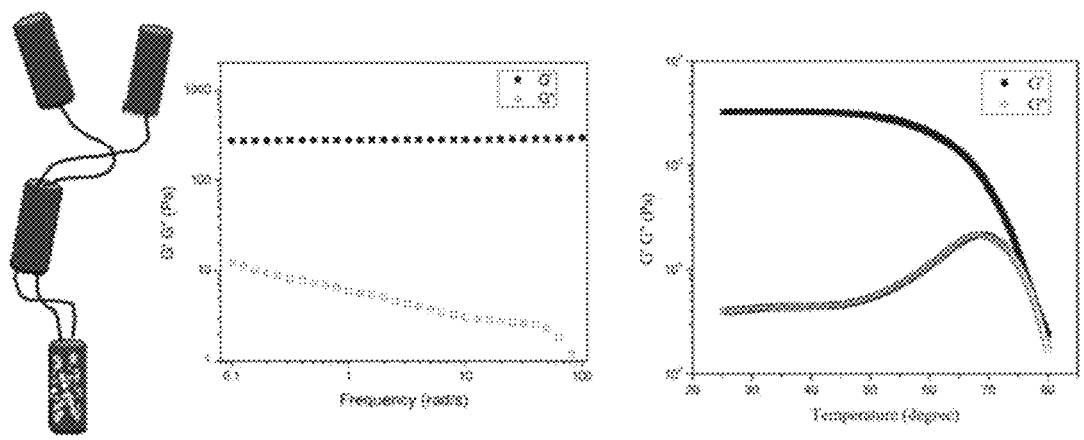
FIG. 21: Network formation with maleimide end functionalized peptide bundles and 4 star PEG connectors (20 k g/mole arms, thiol end groups; spacer moiety) providing for branching during chain formation. Middle: Frequency sweep at 2% strain, 500 mm gap in a parallel plate rheometer showing stiff, solid gel behavior with G', storage modulus/ solid symbols, insensitive to frequency and much greater than the loss modulus. Right: On raising the temperature above the peptide bundle melting temperature of ~50° C., the gel network is destroyed, but reforms on lowering the temperature again.

FIG. 21 illustrates network formation with maleimide end functionalized peptide bundles and 4 star PEG connectors (20 k g/mole arms, thiol end groups) providing for branching during chain formation. The middle panel illustrates frequency sweep at 2% strain, 500 mm gap in a parallel plate rheometer showing stiff, solid gel behavior with G', storage modulus/solid symbols, insensitive to frequency and much greater than the loss modulus. The right panel illustrates that on raising the temperature above the peptide bundle melting temperature of ~50° C., the gel network is destroyed, but reforms on lowering the temperature again.

FIG. 22 illustrates examples of 1-D templated assembly of inorganic particles. In panels (A) and (B), side chain chemistry on a polymer made from designed bundles can be used for specific nanoparticle covalent attachment, controlling the spacing between and type of particle attached. Panel (C) illustrates an example of using inorganic particle as part of 1-D chain backbone where peptide bundles alternate with inorganic particles through covalent attachment. TEM image of such an assembly reveals a loose network of gold nanoparticles alternating with antiparallel homotetramer coiled coils through click reactions (e.g., thiols at N-termini of the peptides with thiol acceptor-functionalized gold nano particles).

Figure 23:
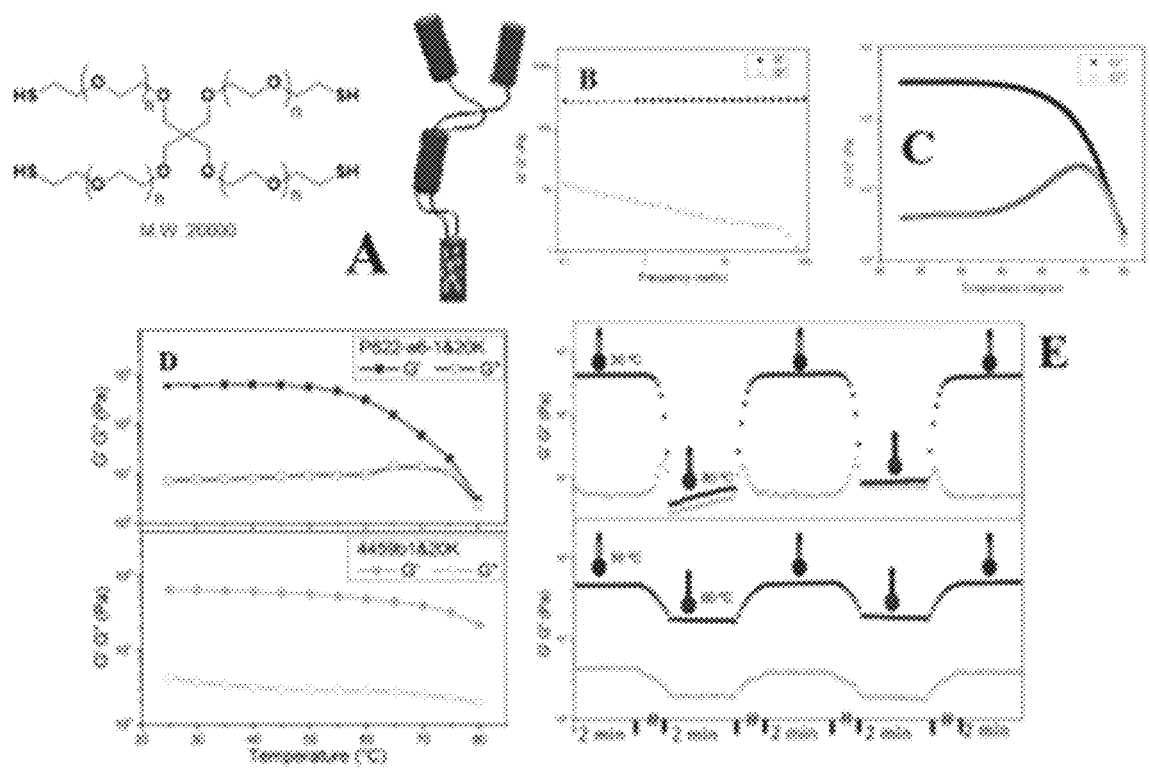
FIG. 23: (A): schematic of bundle network when clicked together with star polymer. (B), (C): Frequency sweep and strain sweep, respectively, of hydrogel material formed as shown in (A). (D): Temperature sweeps of hydrogel moduli where hydrogels were formed with different bundles. The melting behavior of the bundle hydrogel crosslinks is reversible as shown in (E). Temperature ramps in (E) lasted for 10 minutes.

FIG. 23 shows in panel (A) a schematic of a bundle network when clicked together with star polymer. Panels (B) and (C) illustrate frequency sweep and strain sweep, respectively, of hydrogel material formed as shown in (A). Panel (D) illustrates temperature sweeps of hydrogel moduli where hydrogels were formed with different bundles. The melting behavior of the bundle hydrogel crosslinks is reversible as shown in panel (E).

Figure 24:
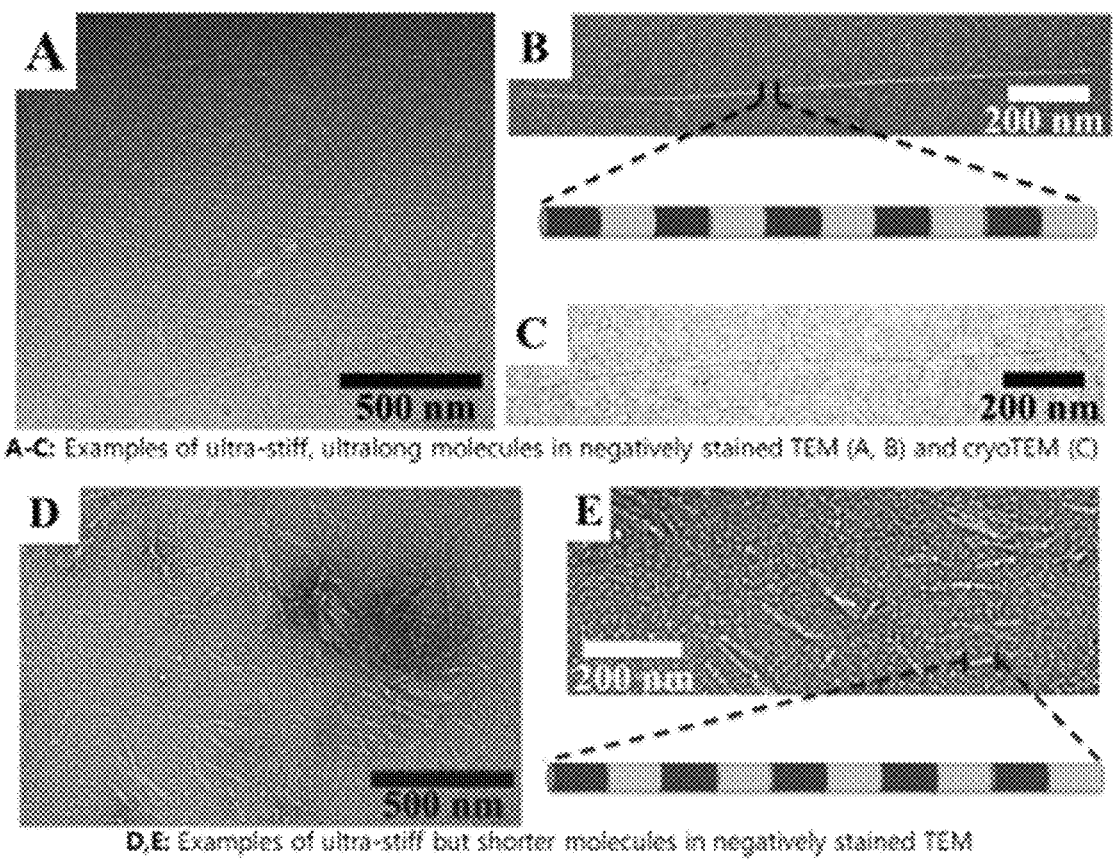
FIG. 24: (A)-(C): Examples of ultra-stiff, ultralong molecules in negatively stained transmission electron microscope TEM (A), (B) and cryoTEM (C). (D), (E): Examples of ultra-stiff but shorter molecules in negatively stained TEM.
Figure 25:
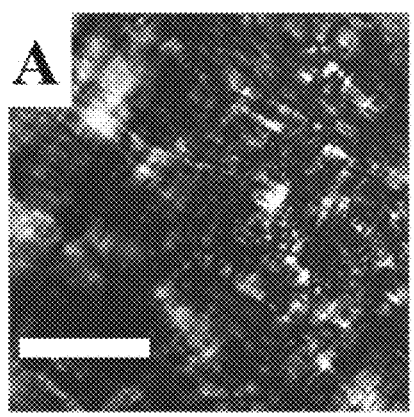
FIG. 25: Examples of ultra-stiff molecules in polarized optical microscopy, POM (A) and negatively stained TEM (B), (C) forming liquid crystal phases when more concentrated in aqueous solution. The brightness in POM is due to aligned, stiff molecules when above ~5 vol. % rigid rod molecules. Local domains of LC behavior is clearly seen the dried sample films shown in (B) and (C) in TEM.
Figure 25:
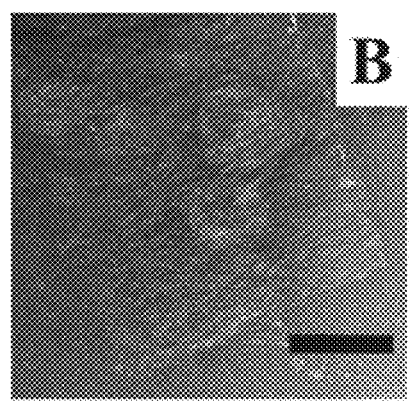
Figure 25:
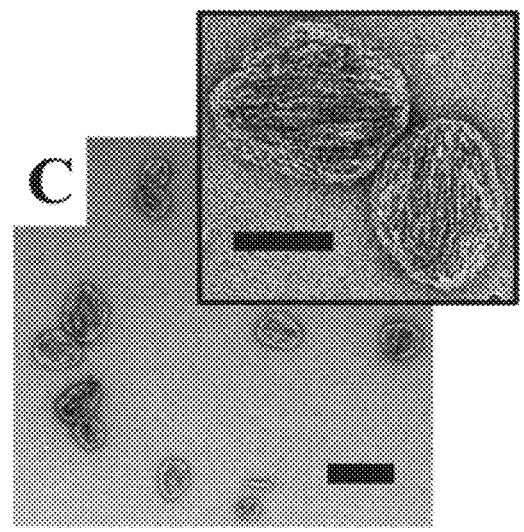
Figure 26:
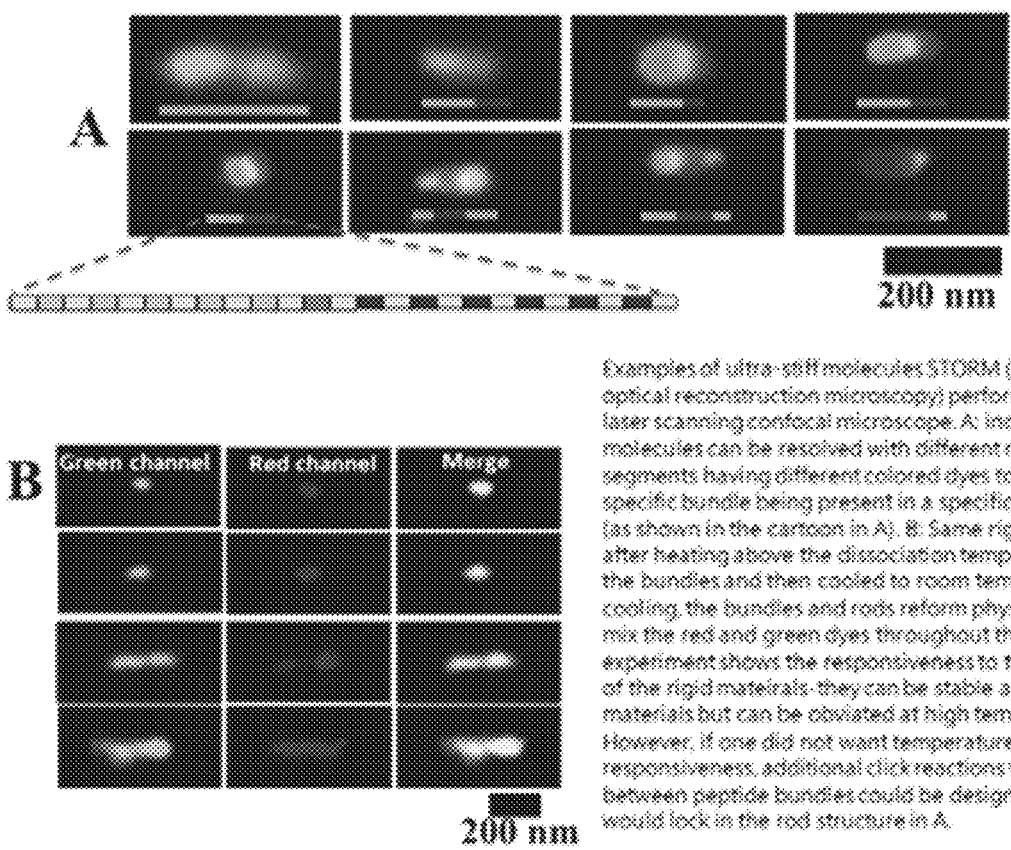
FIG. 26: Examples of ultra-stiff molecules STORM (stochastic optical reconstruction microscopy) performed on a laser scanning confocal microscope. (A): individual rod molecules can be resolved with different rod segments having different colored dyes to show a specific bundle being present in a specific sequence (as shown in the cartoon in (A)). (B): Same rigid rods but after heating above the dissociation temperature of the bundles and then cooled to room temperature. After cooling, the bundles and rods reform physically and mix the dyes throughout the rods.
Figure 27:
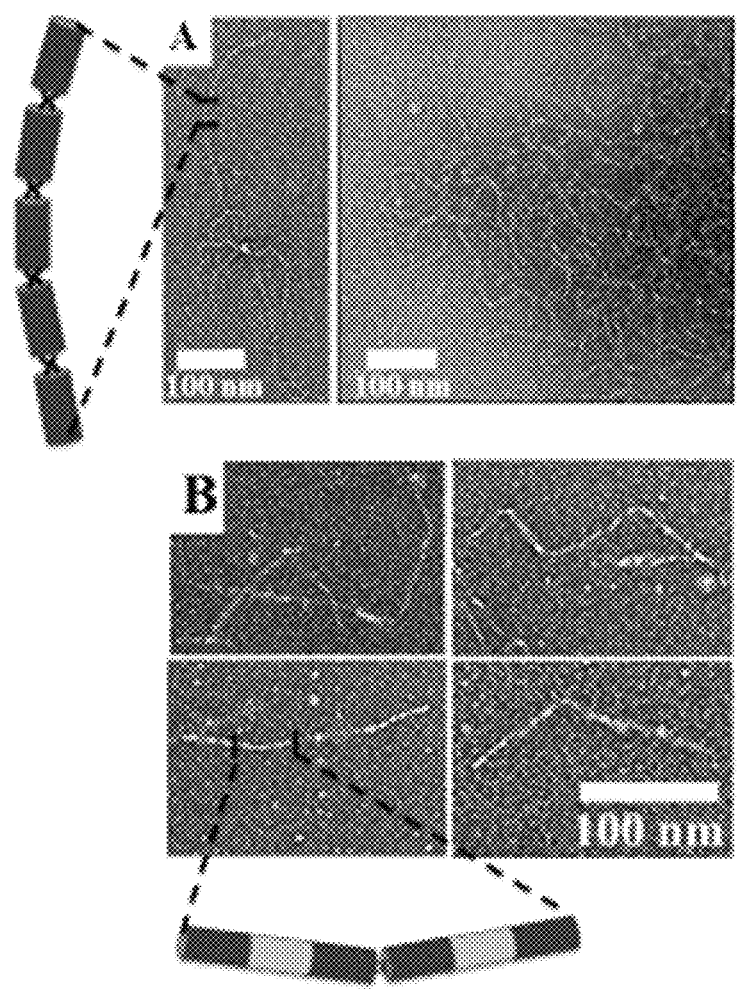
FIG. 27: Examples of semiflexible chains made from same peptide bundles designs and click chemistry but with a small, flexible organic linker (PETMP) between bundles (A) or short rigid rods of multiple bundles as described above (B). In (A), the chains are now not rigid rods but are semiflexible chains due to the organic linker used in the click chemistry. In (B), local segments are rigid rods and produced by click chemistry directly between individual bundles. However, the short rods are then clicked together to form flexible linkers between rods in a single chain, overall producing a kinked polymer chain.

FIGS. 24-27 show imaging data for assemblies of the present invention. FIG. 24 shows examples of ultra-stiff, ultralong molecules in negatively stained transmission electron microscope TEM and cryoTEM. FIG. 25 shows examples of ultra-stiff molecules in polarized optical microscopy, POM and negatively stained TEM forming liquid crystal phases when more concentrated in aqueous solution. FIG. 26 illustrates examples of ultra-stiff molecules STORM (stochastic optical reconstruction microscopy) performed on a laser scanning confocal microscope. FIG. 27 illustrates examples of semiflexible chains made from same peptide bundles designs and click chemistry but with a small, flexible organic linker (PETMP) between bundles (A) or short rigid rods of multiple bundles as described above (B).

The assemblies discussed above are generally referred to as one-dimensional (1-D). Also within the scope of the present invention are higher-order two-dimensional (2D) and three-dimensional (3D) assemblies. Applications and design of these types of structural motifs are described below. In addition, see FIGS. 28-32, which illustrate examples of these structures.

New liquid crystal behavior: There is strong precedent for liquid crystal behavior in rod biomolecules including nucleic acids, viruses, and, significantly, for the assemblies described herein. In particular, while rod-like peptide molecules such as α-helices and rod-like supramolecular assemblies like β-sheet nanofibrils have been shown to produce many examples of liquid crystal behavior, monodisperse polypeptides, synthesized using recombinant DNA biosynthesis, exhibit liquid crystal behavior beyond simple nematic and cholesteric phases. Rod-like, polypeptide molecules and supramolecular assemblies typically form lyotropic phases such as nematics and cholesterics. However, when the molecules are monodisperse in length and composition, more exotic liquid crystal smectic phases were observed.

With the ability to computationally design the individual bundles to contain desired interbundle physical interactions as described herein, in addition to containing desired non-natural amino acids for click chemistry hierarchical chain growth, one can alter lateral interactions between bundles to toggle between different possible liquid crystal phases. It has already been shown that bundles can be designed with proper electrostatic and hydrophobic interactions to produce crystalline-like 2-D assemblies, as shown in FIG. 5. Therefore, the modulating weaker interactions between rods to produce liquid crystallinity is provided by the present invention, particularly since the rod molecules can have well-controlled length and constituent amino acids for desired interactions between coiled coil supermonomers.

Inorganic nanoparticle templated/directed assembly: The specificity of computationally-designed peptide building blocks to assemble into desired nanostructures provides the capability of templating the assembly of other materials in a hierarchical process. The peptide assemblies provide a template for inorganic nanoparticle assembly. The potential of such template assembly of inorganic nanoparticles on the nanoscale provides for scalable construction methods to produce lines (and arrays, in the case of 2-D and 3-D nanomaterial construction, vide infra) of metallic or semiconducting nanoparticles as well as to provide a template for desired inorganic coatings. Many strategies for the templated 1-D assembly of inorganic materials have been explored in the art using solution-assembled nanomaterials. Examples of templates used include nucleic acid polymers, peptide nanostructures, and proteins including viruses. Conveniently, one has many interactions to use when targeting templated assembly of desired, properly functionalized inorganic species with a biomolecular template including physical interactions such as electrostatic interactions, histidine binding, specific binding with a peptide epitope or covalent interactions such as Au-thiol bond formation, NHS ester reactions with amines or click chemistry reactions. While these examples show the versatility of supramolecular nanostructures combined with physical or covalent interactions for templated inorganic material assembly, they lack specificity and control in the exact spacing and placement of inorganic species. Additionally, it is difficult to control the assembly of multiple inorganic species with current templating strategies.

As shown in FIG. 22, the present invention provides the opportunity to template the formation of 1-D inorganic patterns with precise distances between particles as well as to change the types of particles that are assembled. If one uses parallel bundle 1-D nanostructures as shown in FIG. 16, then three or more inorganic species could be included in a 1-D assembly. The control of templating is made possible through the computational design of the peptide bundle building blocks that include an interaction specific to a desired inorganic particle. When the design is coupled with the hierarchical assembly of the bundles and subsequent inorganic assembly, exact control of inorganic 1-D arrays is made possible.

The ultimate success of this strategy to template the assembly of inorganic nanoparticles in 1-D (as well as 2-D and 3-D) may lead to the design and production of localized surface plasmon (LSP) resonance-based materials and devices. Metallic nanoparticle arrays for LSP resonance studies are currently most often produced via slow e-beam lithographic techniques that are also not scalable. Solution assembly provides the opportunity to easily produce large amounts of nanomaterials with desired particle type and interparticle spacing for the potential use in applications such as improved sensing, surface enhanced Raman spectroscopy substrates engineered for strong enhancement, electrically induced transparency, and optical waveguiding.

While this description highlights the use of metallic nanoparticle positioning for future optical applications, the use of this 1-D template introduces other opportunities. While the template can be used for the positioning of different types and sizes of nanoparticles, it can also be used for any molecular object: for example, quantum dots, polymers synthesized via ATRP from a bromide side-group, or co-localized catalysts for efficient chemical conversions in series. If each nanoparticle represents a 'bit' of information, this strand can be viewed as a storage device or barcode.

Finally, the rod-like products themselves can be used as building blocks in further, hierarchical processes to construct 2-D and 3-D materials, as discussed below. Importantly, the computational design and hierarchical pathway afford proper chemical functionality spatial display and interaction to produce higher order nanomaterials.

2-Dimensional Materials: The present invention provides nanostructures having higher dimensions. The peptide computational design for display of chemical functionality can be extended to design connectivity between bundles beyond the more straightforward end-to-end fashion. Furthermore, additional hierarchy of interbundle interactions can be developed to produce nanostructures with desired morphology in 2-D networks. In this embodiment, the display of click chemistry reactants from non-natural amino acids need not be exclusively on peptide termini but can also constitute side chains of amino acids along the length of the constituent peptides within bundles. Accordingly, one can design connectivity between bundles to produce nanomaterial growth along more than one primary axis. Thus, a 1-D, 2-D and a 3-D assembly contains peptide bundles one a single primary axis, two primary axes, or three primary axes, respectively, as described herein.

Figure 28:
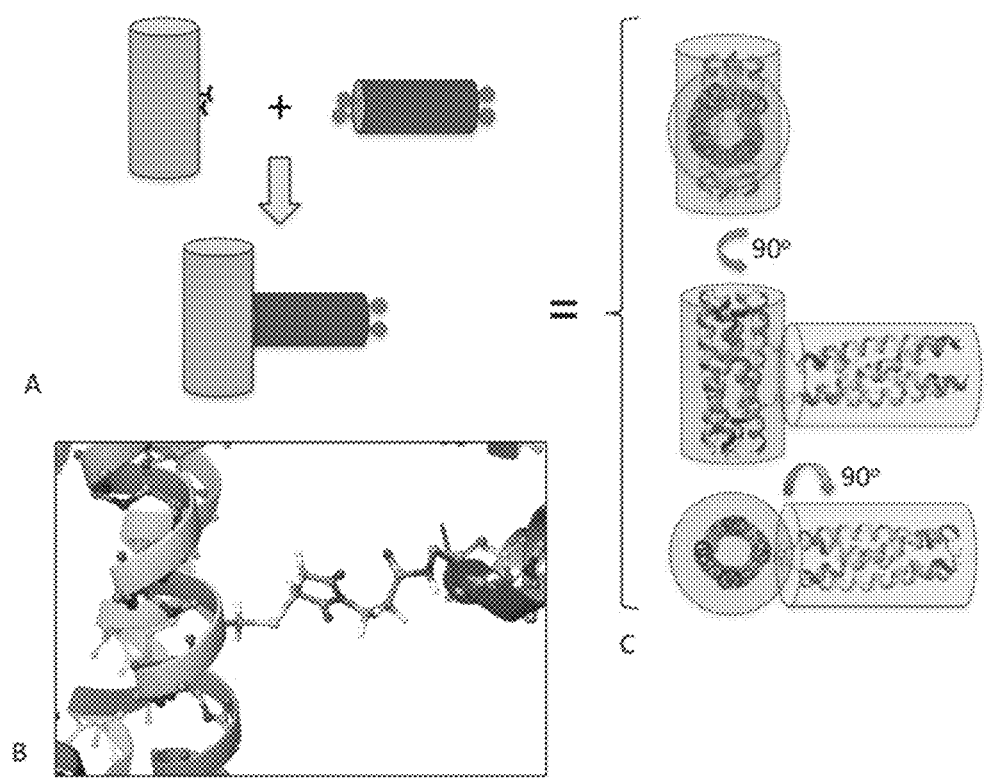
FIG. 28: Model of helical bundles covalently attached in an orthogonal orientation. (A) complementary linking functional groups designed on the exterior of the bundle and at the N-termini. (B) Model of a designed covalent linkage, in this case a thiol-maleimide adduct. (C) Orthogonal perspectives of two tetrameric coiled coils after covalent attachment. Ribbons indicating secondary structure for each helical peptide are shown.

The power of computational design of the coiled coil bundles allows for desired placement and display of covalent interactions to build 2-D objects. FIG. 28 illustrates end-to-body covalent attachment of two tetrameric coiled coil bundles. Such linkages between bundle supermonomers can be computationally designed: relative orientations of bundles can be readily modeled and their compatibility with one or more linking adducts can be evaluated via computational design methods. Noncovalent interactions of nearby residues are designed to complement linking functionality and bundle orientations. In some cases, one can use noncovalent interactions to guide the formation of crosslinks at predetermined positions via so-called proximity effects. The side chain chemistry display and surface area available along the side of a typical bundle make the interaction and connection feasible for material growth along new axes as opposed to exclusively end-to-end connection required for 1-D nanostructure growth.

The following description illustrates several versions of 2-D material growth with proper bundle design and a proper hierarchical pathway to build desired connectivity between peptide bundles. Appropriate covalent cross-linking groups and stoichiometric control allow linkage between properly end-functionalized bundles and complimentary bundles with non-natural chemistry displayed laterally on the exterior of the bundle between the N- and C-termini.

Figure 29:
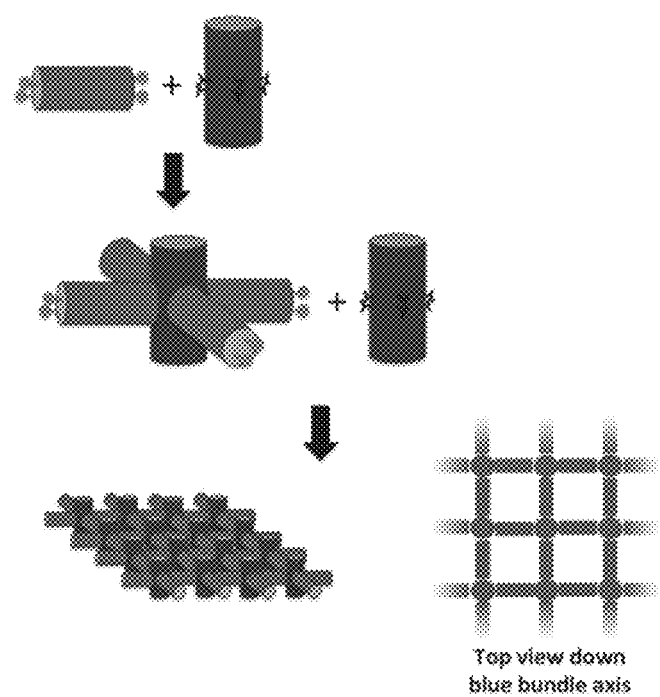
FIG. 29: Example of 2-D hybrid physical-covalent network made from antiparallel tetrameric coiled coils. With large excess of the end-functionalized bundle in step one, formation of the four-spoked hub is favored and easily separated from those with incomplete coupling. Subsequent addition of the blue bundles and covalent coupling produces the 2-D sheet with four-fold symmetry and pore size controlled by bundle length.

One can produce hubs that can be interconnected in order to grow a 2-D lattice with local four-fold chemical symmetry. Such a lattice stands to provide a monodisperse pore size distribution dependent on the lengths of the bundles used. FIG. 29 shows a 2-D lattice that is possible with antiparallel tetrameric bundle building blocks with one bundle being the strut between single bundle hubs. The final 2-D network has a clear four-fold symmetry. With constituent α-helical peptides of the coiled coil bundles being approximately 30-40 amino acids in length, the square pore size would range from 4-5 nm in diameter.

Figure 30:
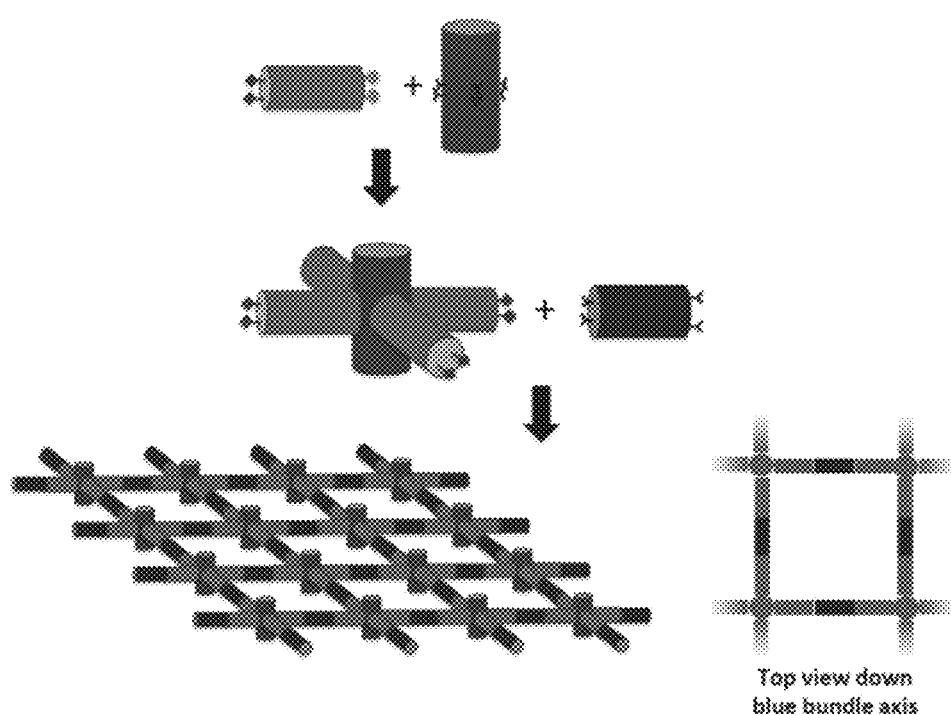
FIG. 30: Example of 2-D hybrid physical-covalent network made from parallel and antiparallel tetrameric coiled coils. Initial reaction of the bundles is specific to one end of the coiled coil producing the four-spoked hub. Subsequent addition of the bundles and covalent coupling between the hubs produces the 2-D sheet with 4-fold symmetry but with a pore size dictated by bundle lengths ranging from 10-15 nm.

The pore size may be altered with the use of peptide computational design and the use of additional bundles and additional click chemistry steps to produce struts of different sizes. For example, if one uses parallel bundles within strut-forming bundles, then one can build an initial hub with reactive ends that require the addition of a new, additional bundle in order to connect the hubs together to form the 2-D network (FIG. 30). A 4-fold network is formed similar to that shown with antiparallel tetrameric bundles in FIG. 29. However, the struts now consist of 3 constituent bundles, thus producing a pore size three times larger in diameter than that formed in FIG. 29. A main advantage to this approach for the design and synthesis of a larger, four-fold 2-D network is that each synthetic step can potentially yield a specific oligomer of bundles, and such oligomers can be hierarchically assembled. With conventional polymer networks, often monomer stoichiometry is tuned to control the average mesh size. However, the peptide bundle-based assemblies are specific and produce an exact mesh size and symmetry. Each click chemistry connective step between robust, computationally designed bundles produces a stable intermediate that cannot further react until the correct, complementary bundle is added.

Figure 31:
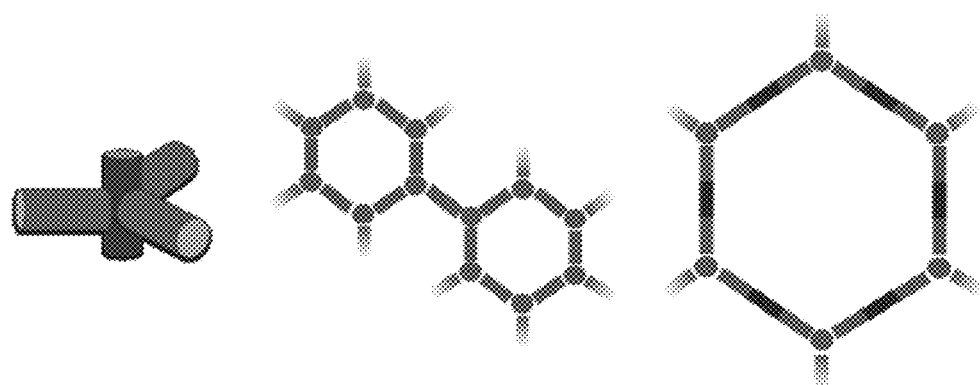
FIG. 31: Example of ability to change symmetry and morphology of 2-D network computational design of trimeric coiled coil hub leading to 3-fold hub symmetry. Connecting hubs (vertices) is a similar strategy as shown in FIGS. 29 and 30. The approach yields a 2-D network with hexagonal-like packing of pores with the size controllable through strut length by use of hierarchical click chemistry steps.

Computational design can also be used to alter the morphology of the 2-D network by alteration of the hub-defining coiled coil bundles. For example, one can design a trimeric bundle where there are only three constituent peptides within the symmetry-defining hub bundles, as shown in FIG. 31. When used in a similar strategy to the 4-fold, square 2-D networks shown in FIGS. 29 and 30, the strategy produces a 2-D network with a more hexagonal-like packing of pores with the pore size also controllable via the length of struts between hubs. As shown in FIG. 31, the final 2-D networks display symmetry unique to the hub bundles.

As discussed above, peptide nanostructures provide a template for inorganic nanoparticle assembly. The aforementioned examples of 2-D peptide nanomaterials provide an excellent opportunity to produce templated arrays of metallic and semiconductor particles in specific, targeted and scalable fashion as opposed to time-intensive electron-beam lithographic techniques. Just as discussed in the 1-D case, there is a strong precedent for using solution assembly of biomolecules to control the assembly of inorganic particles in 2-D including the use of DNA, peptides, or protein sheets. The advantage to the proposed methods is the exact control over the interparticle spacing and interparticle symmetry with the additional ability to co-assemble multiple inorganic particles through the use of proper peptide bundle design and the use of multiple, specific interactions between desired particle and peptide bundle template. Specific to 2-D arrays of inorganic nanoparticles, the design of quantum dot semiconducting particle arrays would potentially impact the understanding of exciton behavior and band engineering in solar cell materials. When light is absorbed in a photovoltaic (PV) material, an electron is excited to a higher energy state (conduction band) leaving a hole where it was (valence band). The electron-hole pair is bound together by their opposite (Coulombic) charges to form an exciton. In solar cells constructed with quantum dot nanoparticles, quantum dots act to break up strongly bound excitons, which occurs in low dielectric constant materials such as polymers to overcome limited exciton diffusion lengths. By controlling the spacing between dots one can potentially understand and control the coupling between quantum dots to lead to rapid spatial dissociation of excitons in multi-dot complexes and provide mechanisms for tuning the solar cell bands. This basic understanding and control can lead to major advances such as the design of intermediate band solar cells. Intermediate band solar cells are an attractive way to combat the biggest limitation to high efficiency solar cells, the so-called Shockley-Queisser limit. Electrons excited by photons with energy greater than the band-gap of the absorber thermally relax to the band-gap while those with energy less than the band-gap are not absorbed. As a result, the optimum efficiency of a silicon solar cell is approximately 30%, and the best commercially available silicon modules are only slightly better than 20%. An approach to increase efficiency is to build intermediate bands into one cell by using arrays of quantum dots (QDs). Therefore, QD arrays made through molecular, solution self-assembled templates can be used to create new paradigms in nanostructured materials with enormous potential impacts on PVs.

Figure 32:
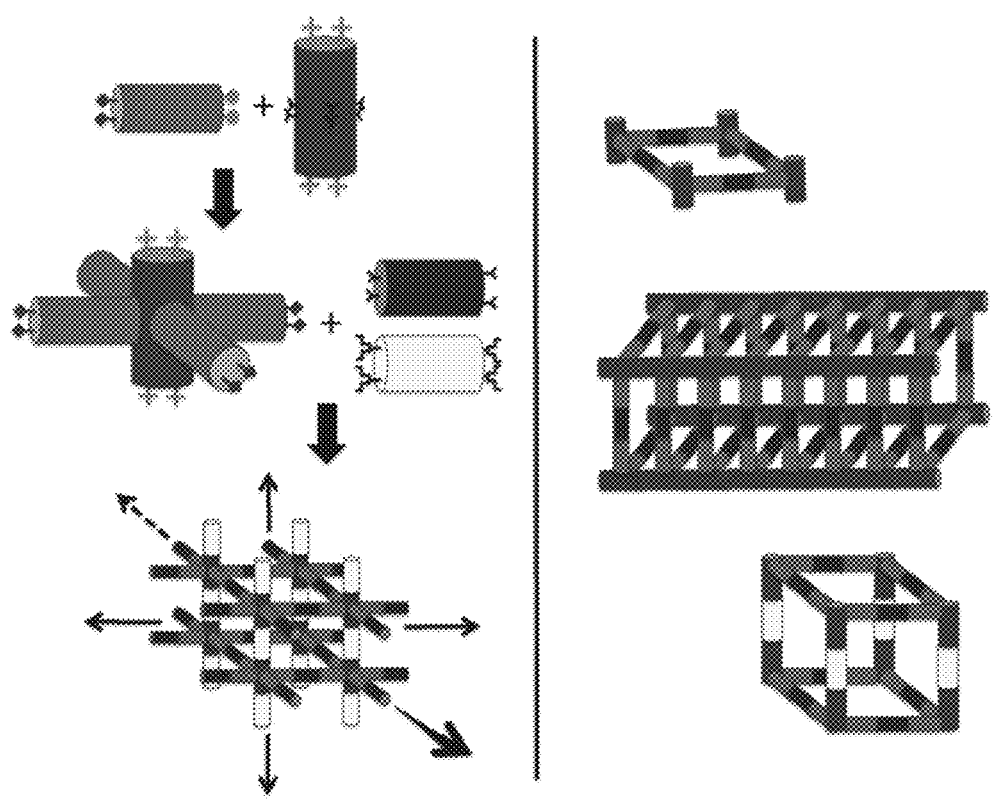
FIG. 32: Example of 3-D materials obtained using hierarchical covalent attachment of computationally designed tetrameric coiled coil peptide bundles. Left: parallel and antiparallel tetrameric coiled coils can designed with an initial reaction of the bundles producing the four-spoked hub. Subsequent addition of bundles, both having covalent interactions specific to the exposed end of the bundles, produces a 3-D network with defined pore size and interconnectivity in all three dimensions. Right: Examples of discrete objects possible with proper computational design of parallel coiled coils, heterotetramers in addition to homotetramers, and proper experimental design of hierarchical covalent and physical assembly steps.

3-Dimensional Materials: The present invention also provides 3-D network materials or discrete particles. Specifically, coiled coil bundles can be computationally designed to produce a desired display of natural and non-natural amino acid side chains and peptide termini to allow the desired covalent interactions for 3-D material growth. FIG. 32 shows a straightforward extension of the strategy used to produce the 2-D networks above to produce a 3-D network with a defined symmetry of pore spacing as well as defined pore sizes. Importantly, the production of the 3-D network relies on straightforward computational design of new coiled coil bundles that contain the appropriate click chemistry reactive functional groups exposed from the body and/or termini of both antiparallel and parallel coiled coil bundles. With tetrameric coiled coil bundles as both hub and strut, one can first produce the 4-fold hub through an initial reaction. However, presentation of click reactive functional groups on the termini of the hub bundle allows for growth of the nanostructure in thickness just as strut-forming bundles are added to produce growth in 2-D. The combination of click reactions produces a 3-D network with specific pore volumes as well as anisotropy in network properties. Importantly, one can design in anisotropy in transport through the network structure as well as in mechanical properties of the final 3-D network structure through bundle building block size and stability as well as the desired interbundle physical and covalent interactions. For example, with different lengths of bundles in FIG. 32, one can independently alter the pore sizes along the z-axis, or thickness, vs. alteration of the pore sizes within the x and y plane. Furthermore, one can work towards more complex designs with additional click chemistry reactions and the use of heterobundles (multiple peptides constituent to a computationally designed coiled coil bundle) to produce more exotic 3-D networks or particles. For example, the green bundles on the left of FIG. 32 need not all be the same bundle if the blue hub former were a heterobundle. Then one could also have specific control of network growth in all three dimensions using three different strut-forming bundles and three different click chemistry reactions. Discrete objects are also possible (FIG. 32, right) when one begins to consider heterobundle design, the use of additional click reactions and a proper hierarchical assembly pathway with ease of purification between steps made possible by the large molecular weight of the individual bundle building blocks.

With specificity possible through bundle design and hierarchy of assembly steps, a clear possibility is the construction of network materials with exotic transport and/or mechanical properties. For example, with the control of pore size, potentially independently along all three, orthogonal design axes, one can produce designer transport through the network material dependent on the direction through which an analyte is diffusing or flowing. The resulting material could serve as a separation membrane for complex mixtures that elutes desired species along a desired axis. Furthermore, side chain chemistry of strut bundles can include desired chemistry to enhance or hinder flow of desired solution species along desired axes through the network. Ultimately, the network could also contain catalytic sites or other reactive chemistry in desired, specific sites within the network for solution species transformations during transport through the network.

Networks with exotic mechanical properties are also possible with the 3-D network growth. Through covalent interactions between, and within, all constituent bundles, the networks would be expected to have extreme stiffness with respect to shear, compression and tension. In response to large tension, the materials would also be expected to exhibit extreme elongation and strength due to the ability of individual α-helical peptides within bundles to denature in response to the mechanical force as well as to the fracture of covalent interactions within, and between, bundles. The present invention allows one to design in anisotropic mechanical behavior by having bundles along a desired axis have no covalent internal crosslinking so that the network is more easily deformed along that desired axis. This would allow for mechanical alteration of network pore sizes along a desired axis with return to the original pore size after the release of mechanical force and refolding of the deformed peptide bundles.

Finally, the ability to produce discrete particles from computationally-designed peptides provides opportunities in the creation of designed nanoparticles for possible impact with a prime example being synthetic virus-like particles.

Importantly, the final particles consist of stable, folded peptides that can be further stabilized by covalent interactions.

The following Examples illustrate the features and benefits of the present invention. Of course, these are merely representative examples of the invention and is not intended to be limiting in any respect.

EXAMPLES

Summary

Peptides were computationally designed to assemble into robust, tetrahelical bundles. Once noncovalently assembled, the bundles act as 4-nm monomers that can be covalently linked through designed "click" reactions, ligating bundle termini to produce a array of polymeric nanostructures. Ultra-rigid chains in aqueous media exhibit persistence lengths of at least tens of microns. Thermally reversible assembly is confirmed using subdiffraction imaging methods. These rigid-rod polymers also form smectic liquid crystalline phases. The same bundles can be linked using alternate "click" reagents to yield semiflexible polymer chains as well as kinked polymers comprised of rigid-rod segments with flexible linkers. Use of star polyethylene glycol linking reagents yields hydrogel networks whose temperature-responsive properties coincide with the melting temperatures of the bundles employed. The rigidity of bundle monomer size, shape and display of chemical functionality allows hierarchical nanostructure formation, independent control of amino acid sequence and chain flexibility, and direct imaging of the polymer chains.

Figure 33:
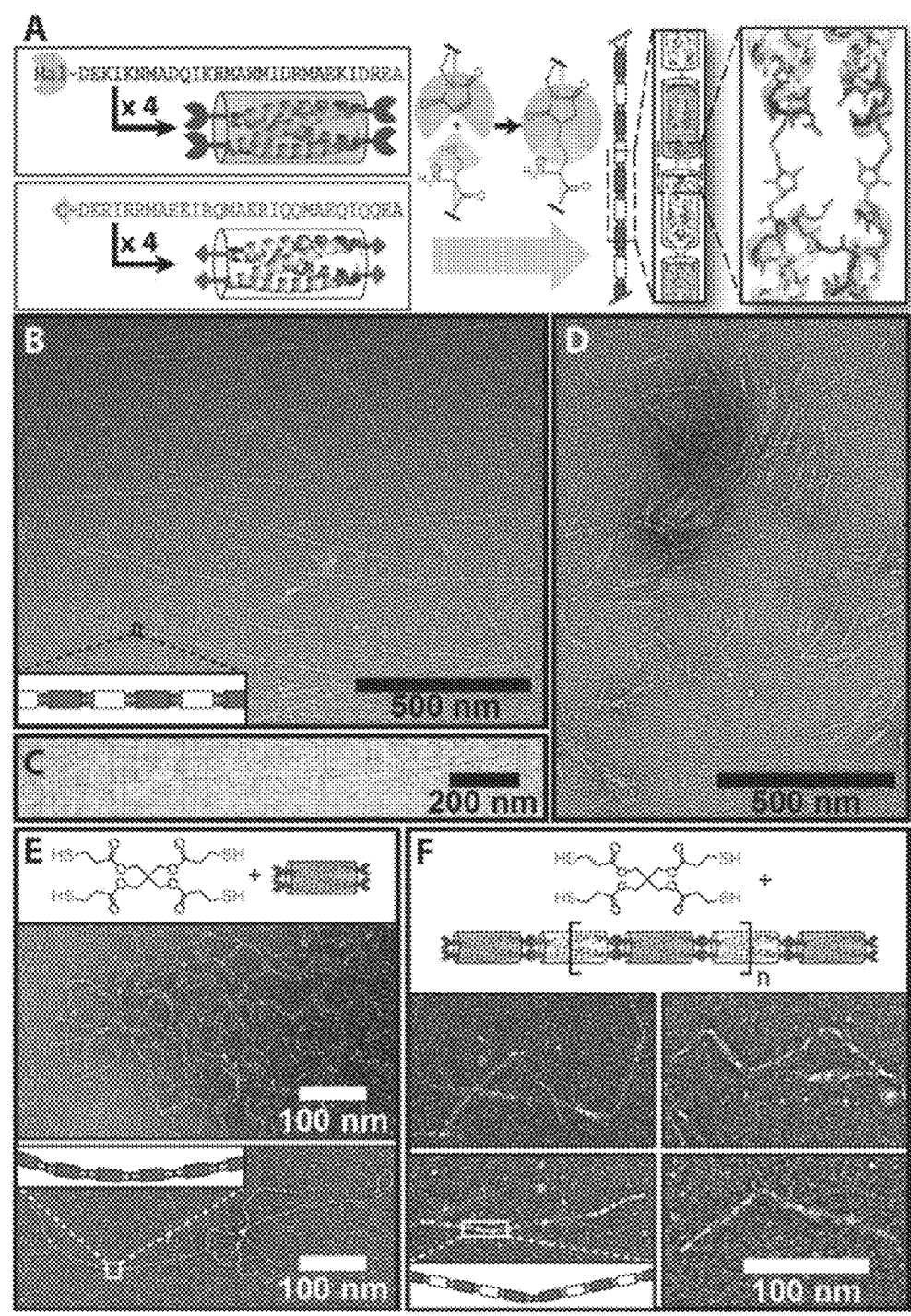
FIG. 33: Peptides computationally designed for homotetrameric, antiparallel coiled coil bundle formation via physical self-assembly and subsequent polymer chain formation via covalent assembly. (A) N-termini and C-termini of the peptides highlighted. One bundle-forming peptide (SEQ ID NO: 3) is functionalized with maleimide at the N-terminus while the other (SEQ ID NO: 1) contains an N-terminal cysteine with its thiol side chain. The bundles are shown as a gray cylinder (maleimide-containing peptide) and white cylinder (thiol-containing peptide). Thiol-Michael click reaction occurs between the maleimide and the cysteine of neighboring peptide termini producing the peptide bundle chain with two covalent linkages between neighboring bundle monomers. (B) Transmission electron microscopy (TEM) of long, individual rigid-rod bundle chains produced with symmetric ratio of maleimide and cysteine-functionalized bundles (negatively stained with phosphotungstic acid, PTA). (C) Cryogenic TEM (cryoTEM) of rigid rod in aqueous solution with length>1 µm. (D) Negatively stained TEM of short rigid rod chains produced with an asymmetric ratio of reacting bundle monomers. (E) PETMP tetrathiol organic linker used to connect maleimide-functionalized bundles into semiflexible chains revealed in the negatively stained TEM images. The chain semiflexibility is due to the molecular flexibility of the PETMP. (F) Segmented chains produced by first producing short rigid rod chains with maleimide-containing bundles at the ends of the short rods and then subsequently connecting the short rigid rods together with PETMP. The short rod segments within the segmented polymer range in length from ~50 nm up to ~100 nm thereby revealing the constituent short rods to contain from ~12-24 bundles (~4<n<10).

Peptide chain construction is illustrated in FIG. 33. The first example uses two different coiled coil peptide bundles, the constituent peptides of which were modified at their N-termini in order to participate in a covalent polymerization through thiol-Michael click chemistry, FIG. 33A. The bundles used throughout the work are antiparallel homotetramers that form stiff cylinders ~4 nm in length and ~2 nm in diameter. One bundle in FIG. 33A contains maleimide functionality from the N-termini of the four constituent 29 amino acid peptides, thereby placing two maleimides from each terminus of an assembled antiparallel bundle. The partner bundle for polymer formation contains cysteine as the N-terminal amino acid thus providing a thiol side chain. The maleimide and thiol termini can undergo a thiol-Michael condensation reaction to produce two covalent bonds between neighboring bundles and, consequently, produce hybrid physical-covalent polymer chains. The resultant polymer chains that are formed display an unprecedented rigid-rod character. The extreme polymer chain stiffness is evident in FIGS. 33B-D where both negatively stained transmission electron microscopy (TEM) and cryogenic TEM (cryoTEM) data reveal the clear rigid-rod character. Direct imaging of the rigid-rod polymer chains is possible since the polymer cross-section is defined by the constituent peptide bundles and their four constituent alpha-helical peptides. Small-angle neutron scattering (SANS) of the rigid-rod polymers confirmed that the polymer chain cross-sections are, in fact, a single bundle in diameter, ~2 nm, similar to the diameter of a typical single-walled carbon nanotube. While 1-d assemblies of proteins can exhibit a high stiffness and chain rigidity (e.g., viruses, actin, microtubulin, mis-folded globular proteins, all are assemblies of much larger proteins with many interparticle interactions and wide rod cross-sections with significant amounts of protein mass/length). Similarly, past physical assembled coiled coils also produced stiff fibers that are large in cross-section relative to the molecular protein or peptide building blocks. The biopolymer with the closest cross-section to what is observed here is double stranded DNA. However, DNA, known to be one of the most stiff polymer chains, has a persistence length of only 50 nm depending on solution conditions. The negatively stained TEM data and cryoTEM data in FIG. 33 show rigid chains of ~1 μm or more in length that display rigid-rod behavior along the entire chain length. Preliminary estimates of the rigid-rod persistence length based on methods developed for rod and fiber analysis in two dimensions provide values>40 μm, extraordinary rod-like behavior for such a thin, molecular object with a cross-section of a single tetrameric peptide bundle.

Hybrid physical covalent chains using linked proteins have until now produced more flexible chains. This is due to the flexibility of the linear polymer linkers between proteins in hierarchical fibrous assemblies or between the dimeric coiled coils that link the final polymer together. Electrostatic physical interactions have been used to assemble hexameric peptide coiled coils into chains to produce peptide nanotubes with semiflexibility along the chain length. These same peptide nanotubes were also linked together covalently through native chemical ligation to form hybrid physical-covalent peptide chains. However, unlike the rigid-rods produced herein, the resultant chains were short with an irregular trajectory along the chain backbone. An important aspect to the design of the extreme rod rigidity that is free of defects presented here is the use of antiparallel homotetrameric coiled coils as the supramolecular monomer building block for polymerization with only the N-termini functionalized for covalent interaction. As schematically shown in FIG. 33A, this provides a situation where covalent attachment across both possible covalent linkers is strongly biased to occur. First, the thiol or maleimide reaction sites are closely displayed from the end of the rigid cylinder monomer bundle. Second, if one covalent bond between an A-A and B-B bundle occurs first, rotational states available in the maleimide alkane linker allow the second covalent bond to form quickly thereafter between the same neighboring bundles. To emphasize, it is the local environment and number of covalent interactions between peptide bundles in the current results that minimize chain defects and provides for the extreme rigidity.

The efficiency of the thiol-Michael reaction provides the direct targeting of rigid-rod polymer length through simple stoichiometric control of reactants. The ultralong rigid-rods in FIGS. 33B and 33C were synthesized with a symmetric ratio of bundle reagents displaying thiol termini and maleimide termini, respectively. However, simply through alteration of the relative bundle ratio (see Methods), much shorter rigid rods are produced (FIG. 33D). Just as one is not limited to a single peptide bundle type or a polymer chain length, one also can use different organic, interbundle linkers to directly alter the physical chain characteristics while still producing a desired sequence of peptide bundles along the chain. For example, one can produce hybrid physical-covalent polymer chains with maleimide functionalized peptide bundles reacting with the organic tetrathiol PETMP, FIG. 33E. This polymerization produces a chain of peptide bundles that now exhibits semiflexibility. The additional chain flexibility is due solely to the molecular flexibility of the PETMP since the same maleimide-functionalized, rigid peptide bundles were used in the synthesis of the rigid-rod chains. SANS of the semiflexible chain in solution indicates a chain with a diameter equal to one peptide bundle, just as in the rigid-rod polymers. One can combine the rigid-rod and semiflexible strategies within a single polymer and produce kinked, segmented chains. Short, rigid-rod bundle chains with maleimide-functionalized bundles at the polymer termini subsequently can be reacted with PETMP to produce kinked, segmented chains, FIG. 33F, with the kinks due to the PETMP conformational flexibility.

Figure 34:
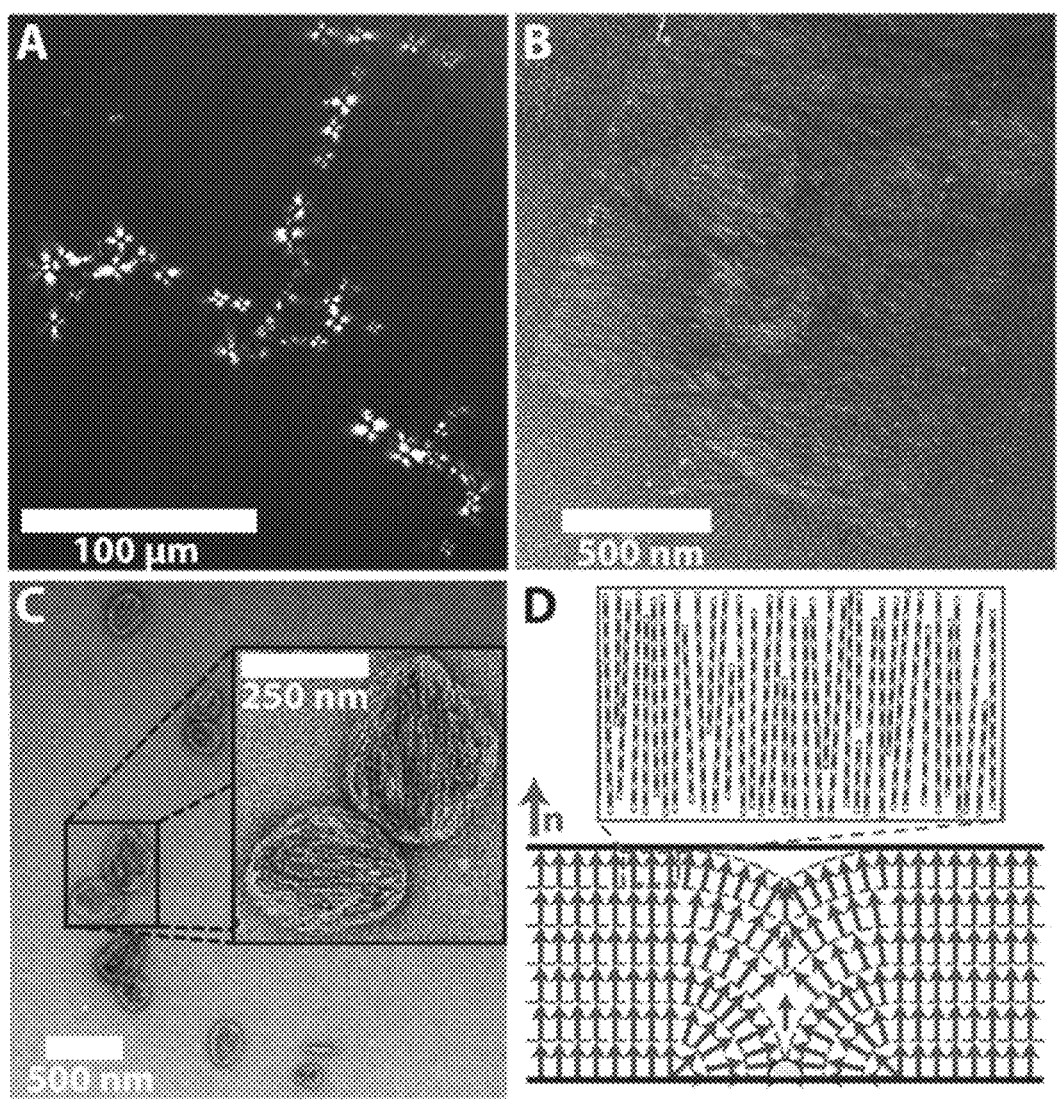
FIG. 34: Liquid crystal behavior of rigid-rod concentrated aqueous solutions. (A) Polarized optical microscopy (POM) of a pseudoisotropic region of ~100 nm long rigid-rods with multiple toric focal conic domains (TFCDs) indicative of a lyotropic lamellar phase. POM was performed on an 8 w/v % short rigid-rod solution at pH 2. (B), (C) TEM of negatively stained short rigid rods from pseudoisotropic region shown in A. (B) shows clear layering of the rigid-rods while (C) reveals structure from dilute regions in which rigid-rods have locally aggregated into droplets with clear rod orientation within the droplets. (D) Schematic of a cross-section of a TFCD formed in smectic A-type lamellar liquid crystals. The dashed lines represent boundaries between smectic layers confined between parallel walls (thick black lines, the glass slide and cover slip in the POM, respectively) such that the liquid crystal director n in the film is perpendicular to the smectic layers. The local orientation director within the smectic A layer is parallel to n far from the TFCD, shown here by gray arrows. In the vicinity of topological defect of strength s=+1, also known as a boojum (circle), the layers fold towards the defect as depicted in the image. On the top of (D) is an enlarged schematic of a single smectic layer showing the proposed homeotropic alignment of individual rigid-rods in the layer.

The rigid-rod character of the peptide bundle chains enables exciting opportunities in the design of new liquid crystalline materials. The hybrid physical-covalent peptide rods exhibit lyotropic liquid crystalline behavior in concentrated solution with optical textures typical of lamellar liquid crystal phases, specifically of toric focal conic domains (TFCDs) observed in smectic liquid crystals when confined to thin films in which the smectic layers are generally parallel with the sample substrate. Apparent TFCDs are observed in polarizing optical microscopy of thin films of 8 wt % rod solutions (FIG. 34A) in which the constituent rods were targeted to be ~100 nm in length. TEM of samples taken from different regions of the liquid crystal solution reveal clear inter-rod organization (FIG. 34B) and the initiation of liquid crystal phase droplet formation in regions that were more dilute in rods (FIG. 34C). Peptide or protein fibrillar assemblies, typically with much wider cross-sectional diameters, are known to form liquid crystal phases due to inherent rod-like character. Given the extreme stiffness of these new physical-covalent rod molecules, the ability to target desired length distributions of rods, and the ability to alter the rigid-rod chemistry using computational design and non-natural amino acids, these systems open a wide area of research in liquid crystal material design.

Figure 35:
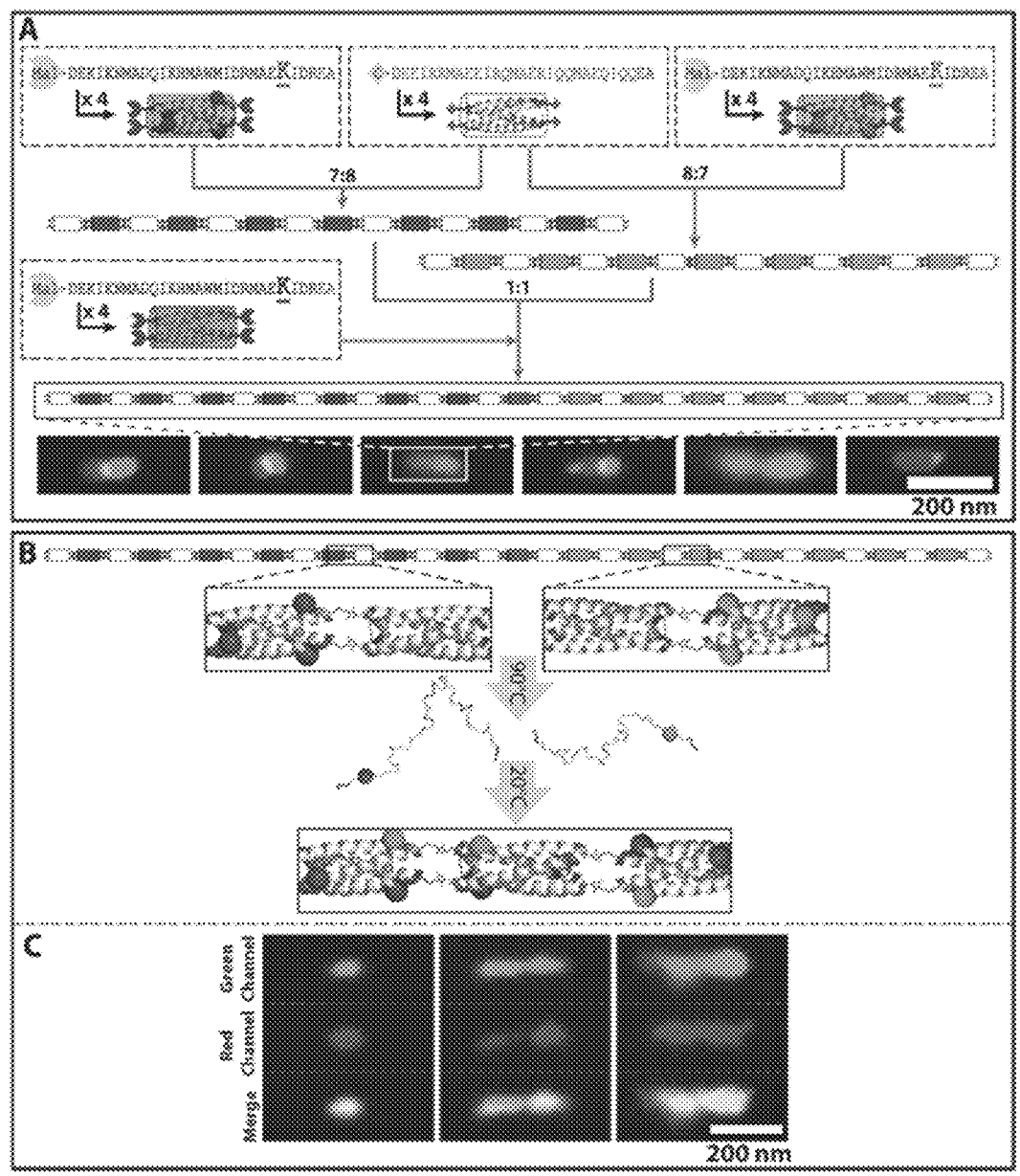
FIG. 35: Reversible noncovalent assembly of rodlike polymers. (A) Peptide bundles from FIG. 33 (SEQ ID NOs: 1 and 3) were used to build short rod segments that contain a specific fluorescent dye. Two types of maleimide-functionalized bundle were created using the same peptide sequence, each labeled with green or red fluorescent dye attached at the highlighted lysine side chain. A second bundle type (white) contains cysteine N-termini. After covalent formation of short rigid-rods comprising bundles with a single dye type, the red and green short rods are joined together to make longer rods through addition of a bundle with no dye and maleimide N-termini (gray) (SEQ ID NO: 3). The STORM images are of the resulting longer rigid-rods. The cartoon of the hybrid red and green long rod shows a representative bundle number and sequence of the highlighted red-green rigid-rod imaged via STORM. Segments within individual long rods and the segment's constituent red or green fluorescence are easily resolved. (B) By heating the rigid rods above the melting temperature of constituent bundles, the individual bundles along the length of the chain denature/melt producing free peptide dimers. On cooling the solution below the melting temperature of the coiled coils, the bundles physically reform and, consequently, also reform the rigid rod chains. However, an important consequence of the physical re-assembly is that the peptides containing the red and green fluorescent dye side chains are now scrambled throughout the reassembled rigid rod chains. All reassembled rods now display co-localization of green and red fluorescence (and yellow signal when the green and red fluorescence is displayed concurrently) along the entire reformed rigid rod lengths.

With these rigid-rod molecules, the local amino acid sequence along the rods is determined via computational design. With this specified sequence, robust bundle physical assembly, and subsequent covalent polymer formation, one can display desired functionality locally within the polymer chain. High-resolution fluorescence microscopy provides the tool for observation of rigid-rod polymers synthesized with fluorophores attached to specific lysine side chains. Rods with targeted lengths of ~50 nm were first assembled using the same parent peptides as described in FIG. 33 with the short rod termini consisting of bundles displaying thiol functionality (FIG. 33A, more description in Methods). The maleimide-terminated peptides used in the short rod syntheses were functionalized with a desired fluorescent dye (rhodamine; nitrobenzofurazan (NBD); see FIG. 35A). Each maleimide-terminated bundle thus displayed four dye molecules. After short rod synthesis with desired dye incorporation, separate populations of short red rods and short green rods were mixed together along with individual bundles with maleimide termini and no dye (FIG. 33A and FIG. 35A) in order to link the short, dyed rods together into longer rigid-rod chains. FIG. 35A shows a collection of resultant, individual, longer rod molecules formed from connection of short rods. The sub-optical wavelength resolution of the STORM technique (stochastic optical reconstruction microscopy) allows clear observation of the ~50 nm long, individual rod segments within final, longer rods.

While covalent interactions were used to build the short rods labeled with a dye and the longer rigid-rods by linking the short, dyed rods together, the individual peptide bundles within all rods remained physically stabilized through intra-bundle interactions. Individual bundles within the rigid-rod chain are responsive to different temperatures-they can denature at high temperature and reversibly assemble back into rigid rod chains below the bundle melting temperature. In the case of the rigid-rods in FIG. 35, when the temperature was ramped to 90° C. all constituent bundles denatured, causing the long rigid-rods to fall apart into linked peptide dimers, each containing one dye-labeled peptide and one peptide without dye, FIG. 35B. On lowering the temperature below the respective bundle melting temperatures, the bundles re-assemble and, consequently, physically re-polymerize into rigid-rod chains. However, the red and green dyes that were originally segregated into ~50 nm segments within the longer rigid-rods are now thoroughly mixed along the entire length of the reformed rigid-rod chains, FIG. 35C, as evidenced by the co-localization of the spatially resolved red and green fluorescence. This is a direct effect of the assembly pathway. The original pathway used to create segmented rods can be erased with temperature to create a similar rigid-rod superstructure but with the original segmentation of displayed dyes now scrambled after the bundle and chain reassembly process. Importantly, the extreme stiffness of the rod molecules is regained on reassembly and repolymerization of the rods at lower temperature.

Figure 36:
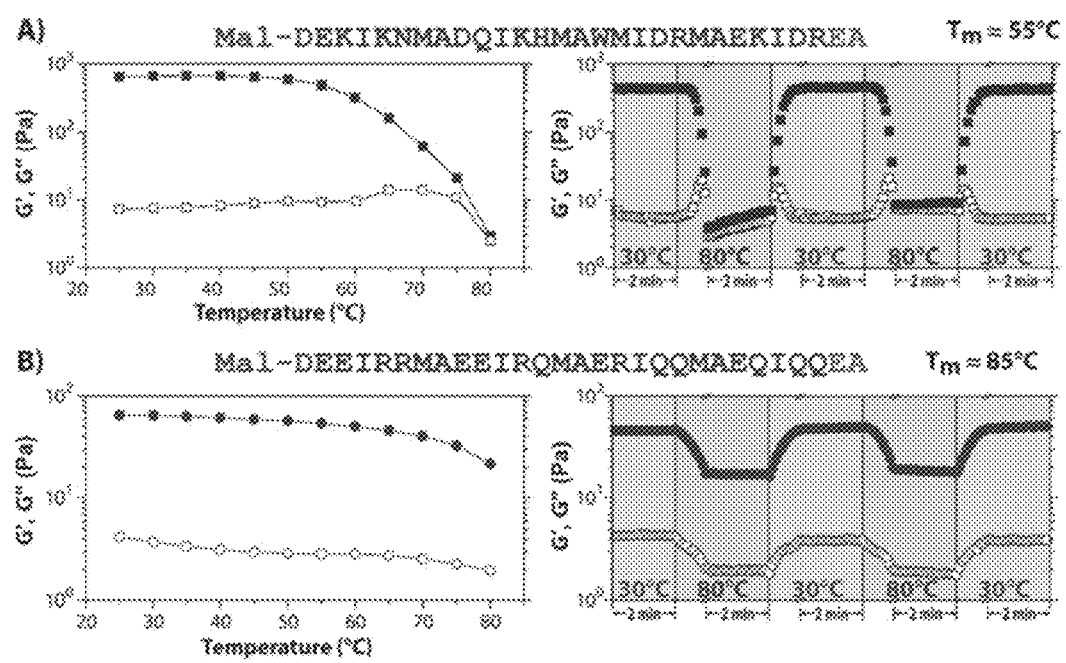
FIG. 36: Hydrogel networks as a result of reacting two different maleimide-containing bundles with a four 20 kD molecular weight armed star PEG molecule with thiol arm termini are illustrated. Temperature dependence of loss and storage moduli: (A) Temperature reversible hydrogel, due to the low melting temperature of the designed, shown peptide (SEQ ID NO: 3) and consequent bundle, shown in both a linear temperature sweep as well as an alternating temperature scan between 30° C. and 80° C. (B) Hydrogel produced with a peptide (SEQ ID NO: 4) bundle stable to approximately 85° C. showing much more rigid gel properties at all temperatures observed. Temperature ramps were performed over 5 minutes in between 2 minute-long isothermal measurements.

By using a 4-arm tetrathiol linker with poly(ethyleneglycol) arms, one can produce a robust hydrogel using individual bundles with maleimide termini. In this case, the bundles now act as crosslinking points in a peptide-PEG hydrogel network. The choice of peptide coiled coil bundle as hydrogel crosslinker can be used to control the temperature response of the network. By using the maleimide-terminated bundle (with a melting/denaturing temperature of ~55° C.) as the network crosslinking junction, the hydrogel can be reversibly obviated and reformed through temperature sweeps above and below the bundle melting temperature, FIG. 36A, as indicated by the temperature dependence of the storage and loss moduli. In contrast, use of a bundle with a much higher melting temperature produces a network that is robust to much higher temperatures due to the bundle crosslinker stability, FIG. 36B.

By using computationally designed, self-assembled peptide bundles as monomers in the creation of polymers, the final characteristics of the chains result from both the properties inherent in the individual peptide bundles as well as the nature of the covalent linkers used to join the bundle monomers into chains. The combination of physical (non-covalent) and covalent interactions makes the entire chain structure reversible at a desired temperature. Computational methods can identify sequences having a variety of desired stabilities, i.e., desired melting temperatures. The choice of hierarchical assembly pathway is critical for defining the sequence of linked bundles. In the presented examples, physical coiled coil bundle formation was followed by covalent linking of bundle termini. This pathway allowed for control of chain stiffness independent of the peptide sequences of the constituent bundles. Sequence specificity with regard to placement of nanoscale monomers is not possible with most supramolecular polymers/nanofibrils where a single self-associating moiety yields a nanostructure (e.g. beta-sheet peptide fibrils, actin filaments, microtubules). These experiments demonstrate how short peptides sequences can be engineered to fold and subsequently yield polymers of linked bundles, allowing asymmetric control of the chemical sequence along the final polymer chain. One can use the reversibility of the physical associations within the bundle building blocks to disassemble and reassemble the polymer chains or the polymer hydrogel networks. The tools of computational design of building block coiled coil bundles and click chemistry for covalent interactions provide possibilities of designer peptide polymer chains, peptide liquid crystalline materials, and even connection of building blocks into desired two- and three-dimensional nanostructures, all with the vast potential functionality made possible with natural and non-natural amino acids, as discussed above in the Detailed Description of the Invention.

Methods

Experimental Details of Peptides Synthesis and Molecular Characterization

General synthesis procedure: All amino acid sequences were prepared at 0.25 mmol scale using rink amide resin through solid phase peptide synthesis (SPPS) on a Liberty blue microwave peptide synthesizer (CEM corporation). Standard Fmoc-based protocols were employed, and the syntheses were performed from C-terminus to N-terminus. The coupling reaction was conducted for 2 minutes at 90° C. with the mixture of N,N'-dimethylformamide (DMF) solutions of 4 eq. of the appropriate amino acid (0.2 mM, 5 mL), 4 eq. ethyl (hydroxyimino)cyanoacetate (Oxyma, 1 mM, 1 mL), and 4 eq. N,N'-Diisopropylcarbodiimide (DIC, 0.5 mM, 2 mL). Four washes were performed in between steps with DMF (7 mL). Fmoc protection group was deprotected by 20% piperidine in DMF for 0.5 min around 90° C. Amino acids and resin were purchased from ChemPep (Wellington, FL) and used as received. Oxyma was purchased from CEM corporation. Piperidine and DIC were obtained from Sigma. DMF was analytical grade (Fisher Scientific). After synthesis, peptides were cleaved from resin by shaking resins in a cleavage solution (different recipe for different peptides). The peptides were then precipitated by adding the cleavage solution to diethyl ether; the mixture was centrifuged, and the supernatant discarded. The process of suspending in diethyl ether, centrifugation, and discarding the supernatant was repeated a total of three times. The resulting peptides were purified by reverse phase HPLC to afford the pure peptides.

Figure 38:
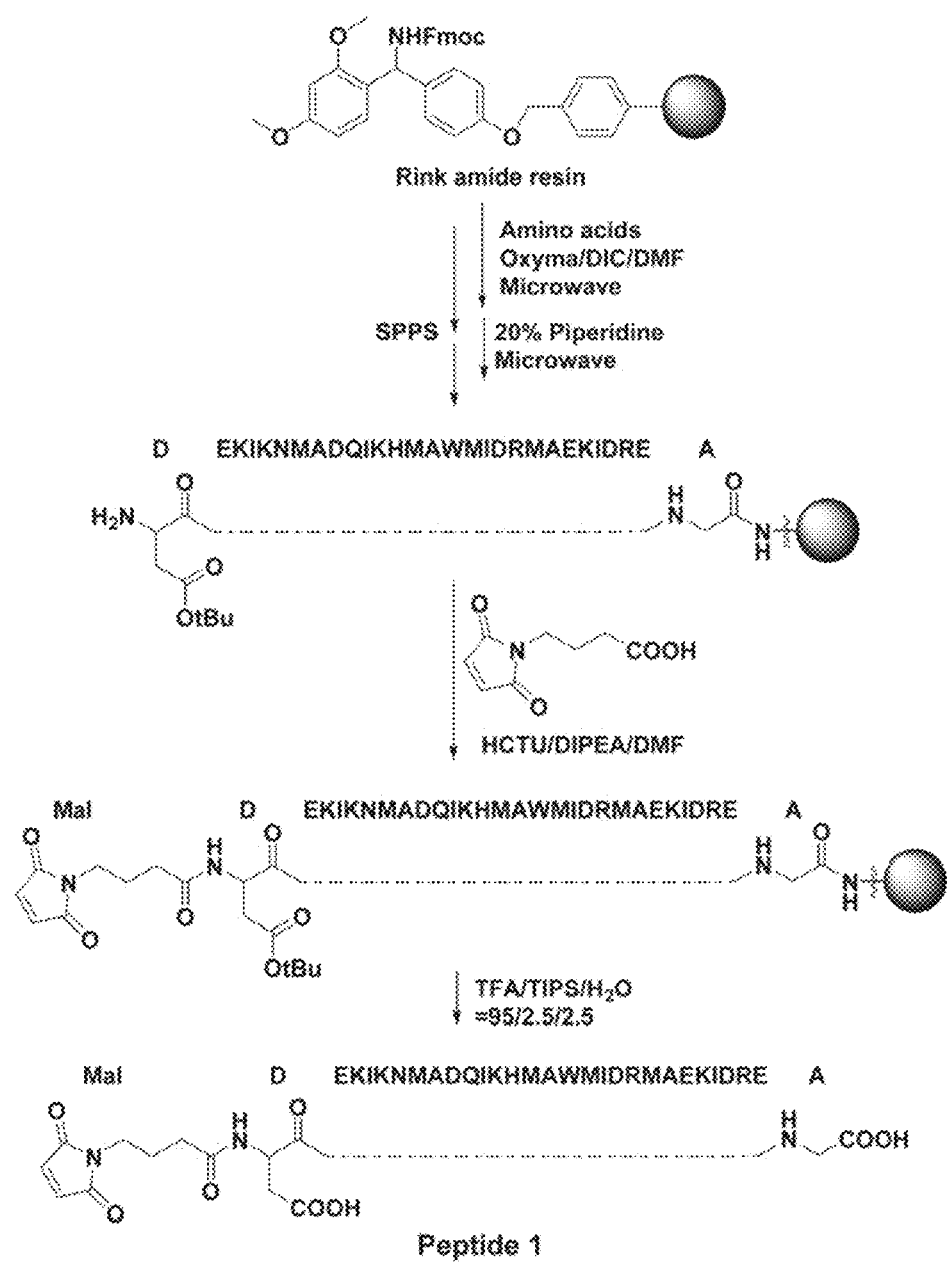
FIG. 38: Synthetic route to peptide 1. Peptide 5 (SEQ ID NO: 3) was obtained according to the same route with different amino acid sequence at the first SPPS step.
Figure 39:
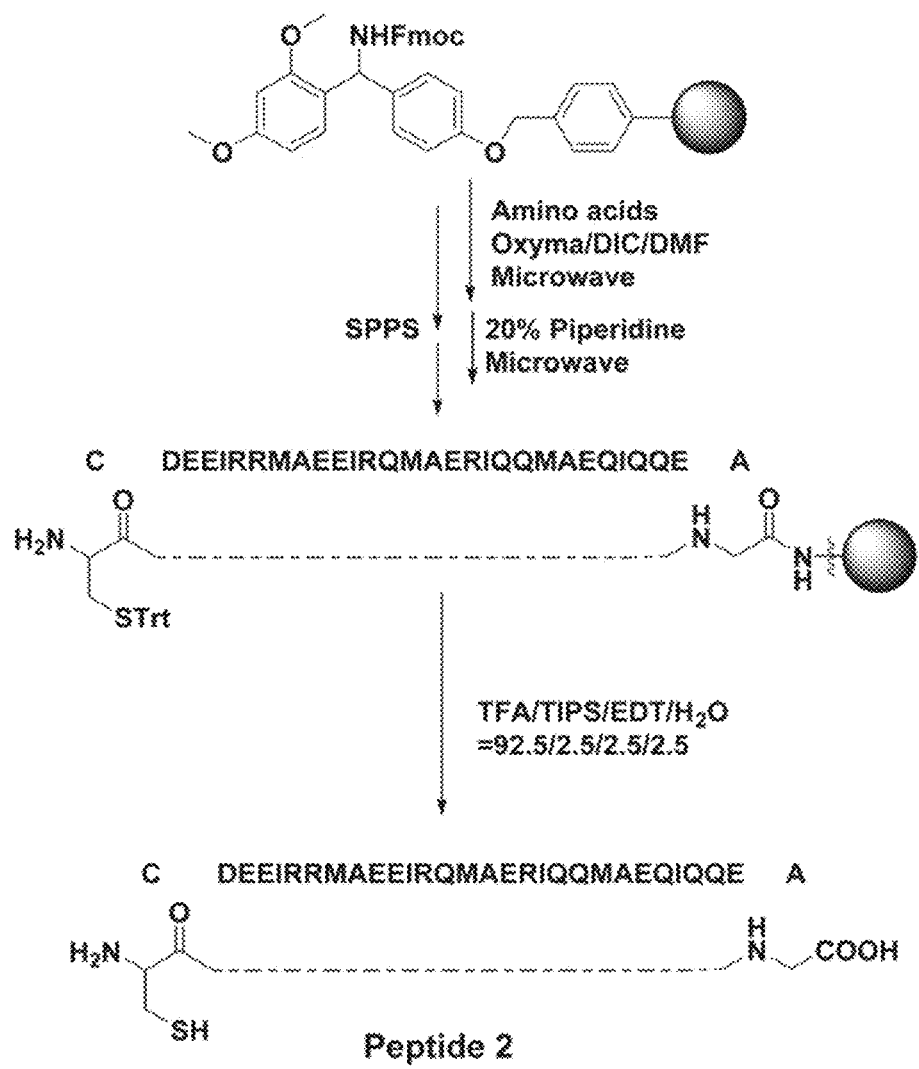
FIG. 39: Synthetic route to peptide 2 (SEQ ID NO: 1).
Figure 40:
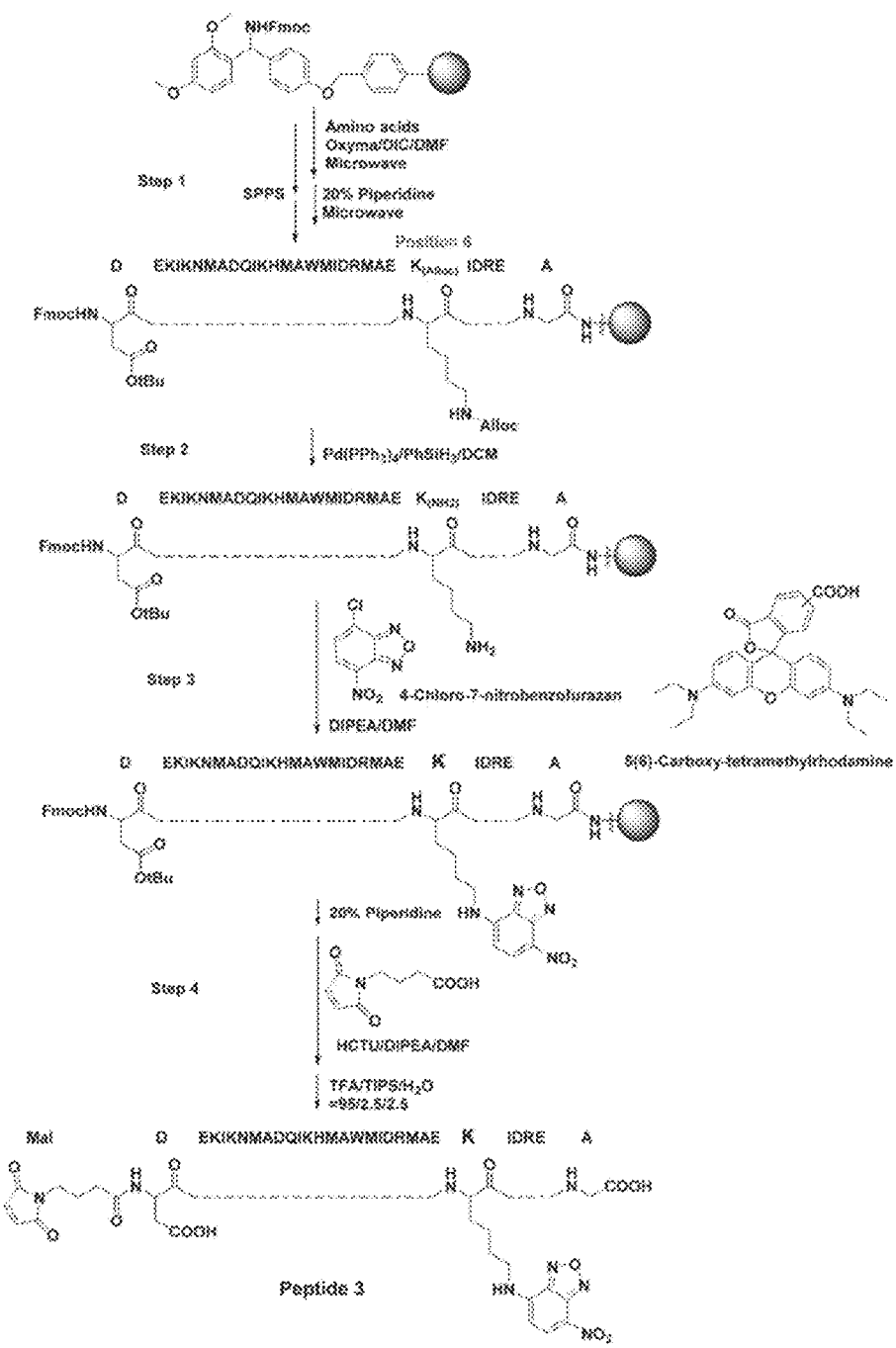
FIG. 40: Synthetic route to peptide 3 (SEQ ID NO: 3). Peptide 3 was obtained according to the same route but using different dye molecule and coupling method in step 3.

Peptides 1 and 5 (SEQ ID NOs: 3 and 2): The sequences of peptides 1-5 are shown in FIG. 37 and synthesis routes are shown in FIGS. 38-40. The 0.25 mmol scale 29 amino acid sequences with all the side chain protected and N-terminal free on rink amide resin were obtained after general SPPS on the microwave peptide synthesizer. Next, a solution of N-(3-Carboxypropyl) maleimide (1 mmol), (2-(6-Chloro-1H-benzotriazole-1-yl)-1,1,3,3-tetramethylaminium hexafluorophosphate) (HCTU 1 mmol) and N,N-Diisopropylethylamine (DIPEA, 2.5 mmol) in DMF (8 mL) was added to the resin, and the solution was shaken for 1 hour. The same solution was added again to implement the double coupling. The maleimide group was then attached at the N-terminus. For the last step, the resin was washed with DMF (10 mL, 3 times) and dichloromethane (DCM, 10 mL, 2 times) successively. Then, the peptide was cleaved from resin using a cleavage solution comprised (by volume) of 95% trifluoracetic acid (TFA), 2.5% triisopropylsilane (TIPS), and 2.5% DI-water for 3 hours, and the resulting crude product was purified by reverse phase HPLC to afford the pure peptide 1 or 5.

Peptide 2 (SEQ ID NO: 1): The synthesis route was shown in FIG. 39. The 0.25 mmol scale, free N-terminus, 30 amino acid sequence with all the side chain protected, on rink amide resin was obtained after general SPPS. The resin was washed with DMF (10 mL, 3 times) and DCM (10 mL, 2 times) successively. Then, the peptide was cleaved using cleavage solution comprised (by volume) of 92.5% TFA, 2.5% TIPS, 2.5% 1,2-Ethanedithiol (EDT) and 2.5% DI-water for 3 hours. The resulting crude product was purified by reverse phase HPLC to afford the pure peptide 2.

Peptides 3 and 4 (SEQ ID NO: 3): The synthesis routes are shown in FIG. 40. Fmoc-Lys(Boc)-OH at position 6 count from the C-terminus was replaced by Fmoc-Lys (alloc)-OH. The 0.25 mmol scale 29 amino acid sequence with all the side chain and N-terminus protected on resin was obtain after general SPPS. Then, the alloc group was removed according to the reported method. The obtained resin was washed with $CH_2Cl_2$ (10 mL, 5 times). Then, a solution of $Pd(PPh_3)_4$ (0.10 equiv.) and $PhSiH_3$ (24 equiv.) in $CH_2Cl_2$ (10 mL) was prepared for alloc deprotection. The deprotection reaction was conducted for 20 mins and repeated once. The resin then was washed with $CH_2Cl_2$ (10 mL, 8 times). For the synthesis of peptide 3, a solution of 4-Chloro-7-nitrobenzofurazan (1 mmol) and DIPEA (2.5 mmol) was added to the resin for the fluorescence dye attachment. For peptide 4, a solution of 5(6)-Carboxytetramethylrhodamine (1 mmol), HCTU (1 mmol), and DIPEA (2.5 mmol) was used for the dye coupling reaction. Double coupling was performed for both fluorescence dye couplings. The N-terminus was deprotected from the Fmoc group by 20% piperidine in DMF (10 ml, 10 min, twice). The same coupling method as peptide 1 was applied to link the maleimide group at the N-terminus, and the same recipe of cleavage solution was used to cleave the peptide from resin. The resulting crude products were purified by reverse phase HPLC to afford the pure peptide 3 or 4.

UPLC and MS-spec: Results were obtained from a Waters Xevo G2-S QTof equipped with a Waters UPLC. The peptide solutions were prepared at a concentration around 10-30 µM in DI water.

Circular Dichroism (CD): The measurements were performed on a Jasco J-820 Spectro polarimeter (JASCO, Inc., Easton, MD). Peptides were dissolved in 25 mM phosphate buffer (pH 6) at 0.2 mM concentration. The CD cuvette was 1 mm in path length (110-QS, Hellma, Inc.). The spectra were recorded from 190 to 250 nm with a 0.5 nm data pitch. The scan speed was 50 nm/min and the signal was averaged over 3 scans. For the temperature scans, peptide solutions were incubated for 3 mins before measurement at each temperature.

Experimental Details for Preparing Different Polymers Using Covalent Thiol-Maleimide Reaction Long stiff fibers: Two peptide solutions of 1 and 2 were prepared at 1 mM in phosphate buffer (pH 6, 25 mM), respectively, for respective bundle formation. Then, the two bunle solutions were mixed with the same volume, and 0.2 eq. tris(2-carboxyethyl)phosphine (TCEP, 50 mM in DI water) was added as catalyst. The bundle mixture was shaken overnight at room temperature to produce the long fibers.

Representative maleimide-excessive short rigid rods: Two peptide solutions of 1 and 2 in phosphate buffer (pH 6, 25 mM) were prepared at 1 w/v %, respectively. The two bundle solutions with different volume were mixed to achieve the molar ratio of maleimide to thiol group of 10 to 9 (e.g. mix 0.528 mL solution 1 and 0.472 mL solution 2 to make 1 mL 1 w/v % solution). Then, TCEP (50 mM in DI water) at 0.2 eq. relative to peptide 2 was added as catalyst. The mixture was shaken overnight at room temperature to produce the short rigid rods.

Semi-flexible fibers: 1 mM Solution of 1 and 0.25 mM solution of Pentaerythritol tetrakis(3-mercaptopropionate) (PETMP) were prepared in phosphate buffer (pH 6, 25 mM), respectively. The same volume of the two solutions were mixed, and 0.2 eq. of TCEP (50 mM in DI water) relative to peptide 1 was added as catalyst. The mixture was shaken overnight at room temperature to produce the semi-flexible fibers. PETMP was purchased from Sigma.

Representative 3 w/v % hydrogel of 1 with 4arm PEG tetra-thiol (20K Da): 8 mg peptide 1 and 10.86 mg 4-arm PEG tetra-thiol (20K Da) were dissolved in 620 µL phosphate buffer (pH 6, 25 mM). 0.2 eq. TCEP (9 µL, 50 mM in DI water) relative to peptide 1 was added as catalyst. The mixture was shaken at room temperature. The hydrogel usually formed after 2 to 4 hours of reaction. The hydrogel then was taken for characterization. 4arm PEG tetra-thiol (20K Da) was purchased from JenKem Technology.

Procedure to make kinked fibers: 1 mL of 1 w/v % short rigid rod solution (with an excess of maleimide-containing bundles to guarantee maleimide termini of the short rods, molar ratio of maleimide to thiol is 10 to 9) was prepared with the protocol described earlier. Then, the appropriate amount of PETMP (2.9 µL, 50 mM) was added to make the ratio of the total maleimide group to thiol group as 1 to 1. The mixture was shaken at room temperature for a week to produce kinked fibers.

Transmission Electron Microscopy (TEM): Carbon-coated 200 mesh copper grids (CF200-Cu, Electron Microscopy Sciences, Inc.) were freshly treated by glow discharge using a plasma cleaner (PDC-32G, Harrica Plasma, Inc.) at low level for 20 seconds. Then, 4 µL sample solution was dropped on the grid. After 1 min, the remaining liquid was blotted from the edge of the grid using filter paper. The grid was allowed to air-dry for 10 min before TEM observation on FEI TALOS™ F200C microscope. For negative staining, 6 µL aqueous solution of phosphotungstic acid (2 w/v %, pH 6) was applied to the dried grid and incubated for 15-30 seconds. Then the grid was blotted with filter paper. The stained grid was allowed to sit for 10 min before TEM observation.

The cryogenic-TEM imaging was also performed on FEI TALOS™ F200C microscope with the accelerating voltage at 200 kV. Lacey grids from Ted Pella, Inc. were used for all grid preparation after the oxygen plasma treatment. Vitrified grid preparation for cryo-TEM was done by using the Vitrobot™, an automated plunge freezing device that vitrifies a thin solution layer to liquid $N_2$ temperature. A sample droplet of 1.5 µL was deposited to the plasma cleaned lacey grids. Depending on sample viscosity and its concentration, blotting parameters were adjusted to obtain the most optimal liquid film thickness, usually requiring 2-3 blottings lasting 1-2 s at 100% humidity. After blotting, the sample grids were allowed 2 seconds for relaxation. In order to achieve extremely fast cooling rate for homogenous vitreous layer, the grid was plunged into liquid ethane (~−175° C.) and then transferred to $LN_2$ for storage. During the imaging, the cryo-TEM holder was maintained at −177° C. to prevent ice crystallization or sublimation. The images were recorded with either FEI Ceta 16M (CCD) or Falcon-II camera (CMOS) at a low dose.

Small angle neutron scattering (SANS): SANS experiments were performed on the NG-B 30 m SANS instrument, a part of the Center for High Resolution Neutron Scattering (CHRNS) at the National Center for Neutron Research (NCNR), National Institute of Standards and Technology, Gaithersburg, MD. Installed on a 60 mm×60 mm split neutron guide NG-B, this instrument delivers a neutron beam of wavelength ($\lambda$) of ≈6 Å with a resolution ($\Delta\lambda/\lambda$) of 10% at full width at half maximum (FWHM). The detector installed on this instrument is a 640 mm×640 mm $^3$He position-sensitive counter with a resolution of 5.08 mm×5.08 mm. Sample-to-detector lengths of 1 m, 4 m and 13 m were employed to cover a q-range of 0.0035 Å$^{-1}$ to 0.4 Å$^{-1}$ for scattering experiments involving the 1 w/v % semi-flexible fibers. A wider q-range of 0.0015 Å$^{-1}$ to 0.35 Å$^{-1}$ was covered for scattering experiments on 1 w/v % rigid rods, enabled by the additional use of neutron lenses at the 13 m detector configuration. Here, q is the scattering vector given by $q=4\pi \sin(\theta/2)/\lambda$. The raw data obtained from scattering experiments was corrected for background noise and radiation, detector sensitivity, and open beam transmission using IgorPro44 software to obtain a normalized scattering intensity curve. Standard deviation was calculated statistically using the number of averaged detector counts at each data point. The reduced 1D scattering intensity obtained after buffer subtraction was fitted to various models using SasView software.

Scattering from an isotropic solution of non-interacting, monodisperse species is described by the general equation[4]:

$$I(q)=nV^2(\Delta\rho)^2 P(q)$$

Here, I(q) is the normalized scattered intensity as a function of scattering vector q; n is the number density of scattering species; V is the volume of each scatterer; $\Delta\rho$ is the difference in scattering length density (SLD) between the scattering species and solvent; and P(q) is the form factor, given by the average geometric shape of the scattering species in solution.

For fitting the scattering curve from rigid rod solution in SasView, a cylinder model was chosen, the P(q) of which is calculated by:

$$P(q) = \frac{scale}{V} \int_0^{\pi/2} f^2(q,\alpha)\sin\alpha \, d\alpha + bkg$$

Where, $$f(q,\alpha) = 2(\Delta\rho)V * \frac{\sin\left(qL\cos\frac{\alpha}{2}\right)}{qL\cos\frac{\alpha}{2}} * \frac{J_1(qr\sin\alpha)}{qr\sin\alpha}$$

Here, $J_1$ is the first order Bessel function; $\alpha$ is the angle between the cylinder axis and the scattering vector q; L is the length of the cylinder; r is its radius. An integral over $\alpha$ from 0 to $\pi/2$ radians averages the scattering intensity over all possible orientations of rods in an isotropic solution.

For semi-flexible rods, a flexible cylinder model fit was performed in SasView. Its form factor P(q) is defined by the equation[45, 47, 48]:

$$P(q) = \frac{scale}{V}\langle f(q,\alpha)\rangle^2 + bkg$$

Where $\langle f(q,\alpha)\rangle^2$ is the average scattering over all possible orientations $\alpha$ with respect to scattering vector q of a worm-like semi-flexible cylindrical chain having a contour length L, radius r and Kuhn length $K_b=2\, l_p$, $l_p$ being the persistence length of the worm-like chain. This model also incorporates excluded volume interactions between segments of the worm-like chain in solution.

Optical Microscopy: A 15 w/v % solution of short rigid rods of average length 200 nm was prepared by gently concentrating a dilute solution of rods as described in the paper by Jung and Mezzenga. Nitrogen gas was blown at a low flow rate into a flask containing 0.5 w/v % solution of short rigid rods that was kept under constant, mild agitation. This slowly concentrated the solution by evaporating water molecules from the exposed air-water interface, avoiding the formation of non-equilibrium structures like crystalline aggregates during the concentration process. The concentrated solution was then adjusted to pH 2 by adding a few drops of 1 N hydrochloric acid. Anhydrous sodium chloride was added to yield a rod solution containing ~100 mM salt. Samples for polarized optical microscopy were prepared by adding 2 µL of the solution between clean glass slide and cover slip. The freshly prepared sample slides were immediately investigated for birefringence due to formation of liquid crystalline phases under polarized light in transmission mode on an Olympus BX60 Light Microscope at 20° C. High-resolution images were captured by a Nikon DS-Fi1 digital camera and the images were analyzed using NIS-Elements imaging software.

Rheological measurement: The hydrogels were prepared as the protocol described below. The measurement was performed on a TA Instruments DHR-3 rheometer (TA Instruments, New Castle, DE). The hydrogel was deposited (160 µL) onto the rheometer stage. A 20 mm stainless-steel parallel plate was used and the gap height was set as 500 µm for measurement. Oil was applied to seal the sample. The storage modulus G' and loss modulus G" were monitored under an applied strain of 0.01% to 10000% at a frequency of 1 rad/s for the strain sweep, and a frequency of 0.1 rad/s to 200 rad/s at strain 0.1% for frequency sweep. Temperature sweeps were performed at the range of 25° C. to 80° C. with the data pitch as 5 degrees. Temperature reversible experiments were carried out by subjecting the gel to 0.5% strain and 1 rad/s frequency.

Experimental Details for STORM Micrographs on Super Resolution Microscopy

Solution sample preparation for rigid rods with individual rod segments containing either red or green dye: Two 0.5 mL solutions of short rigid rods with thiol termini were prepared from click reactions between the same volume of peptides 2 (1 mM) and 3 (0.9 mM) and between the same volume of peptides 2 (1 mM) with 4 (0.9 mM). The two short, rigid rod solutions then were mixed with the same volume and appropriate amount of peptide 1 (100 µL, 1 mM) to make the ratio of total added maleimide group to thiol end groups equal to 1 to 1 in entire solution. The mixture was shaken at room temperature for a week to produce longer fibers containing short rod segments containing both red and green dye.

Solution sample preparation of temperature denatured and subsequently re-assembled rigid rods with mixed red and green dye along entire rod length: The solution of rigid rods with red and green dye-containing segments was heated to 90° C. for 10 minutes to denature the rigid rods. The solution then was incubated at 4° C. for 24 hours to reassemble the constituent bundles resulting in rigid rods with green and red dye mixed along the entire length of the rods.

STORM imaging: The STORM images were taken on the Zeiss Elyra PS.1 super-resolution microscope. Rods were mounted on a high-precision 22 mm×22 mm coverslip (Zeiss) by applying a 10 µL rod solution for 10 seconds. The remaining liquid was removed using filter paper. The sample adhered to the coverslip was rinsed with phosphate buffer (pH 6, 25 mM) 5 times. An oxygen scavenging buffer (540 mM glucose, 3.1 µM Catalase, 7.6 µM Glucose Oxidase, 10 mM NaCl, 20 mM Cysteamine) in 58 mM TRIS-HCl was added on the sample just before image acquisition and sealed in a magnetic CF chamber (Chamlide). STORM images with N-(7-Nitrobenz-2-Oxa-1,3-Diazol-4-yl)-1,2-Dihexadecanoyl (NBD) and Rhodamine were taken with a Plan-Apochromat 100×/1.46 oil objective with 488 and 561 nm laser excitation, respectively. For each STORM image, 500 frames were acquired, aligned using a model-based algorithm, and filtered with 1-30 nm precision. For STORM imaging of rigid rods with individual rod segments containing either red or green dye, images were taken sequentially, merged, and then aligned. All image processing steps were completed in the Zen 2012 software.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A non-natural macromolecular assembly represented by formula (I) or formula (II)

$$PB^1\text{-}[LM^1\text{-}PB^2]_n\text{-}LM^2\text{-}PB^3 \quad (I)$$

$$PB^1\text{—}[SM^1\text{-}PB^2]_n\text{-}SM^2\text{-}PB^3 \quad (II)$$

wherein:
each of $PB^1$, $PB^2$ and $PB^3$ is a peptide bundle where $PB^1$, $PB^2$ and $PB^3$ are the same or different;
each of $LM^1$ and $LM^2$ is a linker moiety that covalently links the peptide bundles $PB^1$, $PB^2$ and $PB^3$;
each of $SM^1$ and $SM^2$ is a linker moiety which also contains a spacer moiety, where each of $SM^1$ and $SM^2$ covalently links the peptide bundles $PB^1$, $PB^2$ and $PB^3$;
n is an integer from 0 to 2,000 or more;
at least 2 and up to 13 peptides comprise each peptide bundle;
each peptide contains 7 to 100 amino acids, where one or more of the amino acids is not found in nature;
each of the peptide bundles $PB^1$, $PB^2$ and $PB^3$ is a coiled coil based on a predetermined, customizable folded nanostructure into which the peptides of the peptide bundles intermolecularly assemble in aqueous solution;
each of the linker moieties $LM^1$, $LM^2$, $SM^1$ and $SM^2$ contains at least one chemical group or moiety that is not found in proteins in nature; and
the macromolecular assemblies represented by (I) and (II) are rigid rod chains, where the presence of $SM^1$ and/or $SM^2$ in macromolecular assembly (II) may increase chain flexibility.

2. The non-natural macromolecular assembly of claim 1, wherein the spacer moiety of $SM^1$ or $SM^2$ comprises an inorganic nanoparticle.

3. The non-natural macromolecular assembly of claim 1, which is a one-dimensional macromolecular assembly.

4. The non-natural macromolecular assembly of claim 1, wherein at least one of the peptide bundles $PB^1$, $PB^2$ and $PB^3$ comprises an amino acid having a side chain functionalized with a drug molecule, RNA molecule, biofunctional peptide, polysaccharide, glycosaminoglycan, fluorescent dye, semiconductive organic molecule, catalyst or inorganic nanoparticle.

5. A method of preparing the non-natural macromolecular assembly of claim 1, comprising covalently linking the peptide bundles $PB^1$, $PB^2$ and $PB^3$ via $LM^1$ and/or $LM^2$ for the macromolecular assembly (I) and via $SM^1$ and/or $SM^2$ for the macromolecular assembly (II).

6. A liquid crystal material comprising the non-natural macromolecular assembly of claim 1.

7. A fiber comprising the non-natural macromolecular assembly of claim 1.

8. The non-natural macromolecular assembly of claim 1, wherein at least one spacer moiety of $SM^1$ and $SM^2$ is of the structure

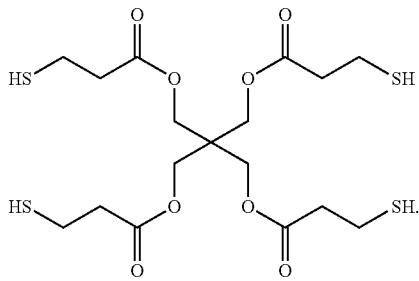 [SMILES: O=C(CCS)OCC(COC(=O)CCS)(COC(=O)CCS)COC(=O)CCS]

9. The non-natural macromolecular assembly of claim 1, wherein at least one spacer moiety of $SM^1$ and $SM^2$ is of the structure

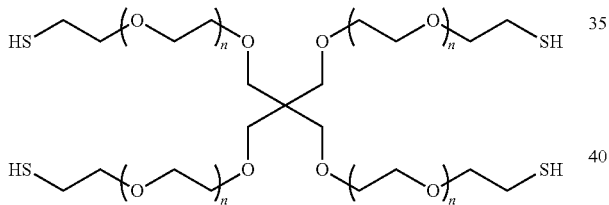

where MW=approximately 20,000.

10. The non-natural macromolecular assembly of claim 1, wherein all the peptides in each peptide bundle have the same sequence as the other peptides in the bundle.

11. The non-natural macromolecular assembly of claim 1, wherein at least one peptide in each peptide bundle has a different sequence than other peptides in the bundle.

12. The non-natural macromolecular assembly of claim 1, wherein at least one of $LM^1$ and $LM^2$ is the product of a covalent reaction between a thiol group and a maleimide group or an azide group and an alkyne group.

13. A non-natural macromolecular assembly represented by formula (I) or formula (II)

$$PB^1\text{-}[LM^1\text{-}PB^2]_n\text{-}LM^2\text{-}PB^3 \qquad (I)$$

$$PB^1\text{—}[SM^1\text{-}PB^2]_n\text{-}SM^2\text{-}PB^3 \qquad (II)$$

wherein:
  each of $PB^1$, $PB^2$ and $PB^3$ is a peptide bundle where $PB^1$, $PB^2$ and $PB^3$ are the same or different;
  each of $LM^1$ and $LM^2$ is a linker moiety that covalently links the peptide bundles $PB^1$, $PB^2$ and $PB^3$;
  each of $SM^1$ and $SM^2$ is a linker moiety which also contains a spacer moiety, where each of $SM^1$ and $SM^2$ covalently links the peptide bundles $PB^1$, $PB^2$ and $PB^3$;
  n is an integer from 0 to 2,000 or more;
  at least 2 and up to 13 peptides comprise each peptide bundle;
  each peptide contains 7 to 100 amino acids, where one or more of the amino acids is not found in nature;
  each of the peptide bundles $PB^1$, $PB^2$ and $PB^3$ is a coiled coil based on a predetermined, customizable folded nanostructure into which the peptides of the peptide bundles intermolecularly assemble in aqueous solution;
  each of the linker moieties $LM^1$, $LM^2$, $SM^1$ and $SM^2$ contains at least one chemical group or moiety that is not found in proteins in nature; and
  the macromolecular assemblies represented by (I) and (II) are 8 nm to greater than 1 μm rigid rod chains with a cross-sectional area defined by $PB^1$, $PB^2$ and $PB^3$, and where the presence of $SM^1$ and/or $SM^2$ in assembly (II) may increase chain flexibility.

* * * * *

SEQUENCE LISTING

```
<160> NUMBER OF SEQ ID NOS: 4

<210> SEQ ID NO 1
<211> LENGTH: 30
<212> TYPE: PRT
<213> ORGANISM: Artificial Sequence
<220> FEATURE:
<223> OTHER INFORMATION: Synthetic

<400> SEQUENCE: 1

Cys Asp Glu Glu Ile Arg Arg Met Ala Glu Glu Ile Arg Gln Met Ala
1               5                   10                  15

Glu Arg Ile Gln Gln Met Ala Glu Gln Ile Gln Gln Glu Ala
            20                  25                  30

<210> SEQ ID NO 2
<211> LENGTH: 29
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (1)..(1)
<223> OTHER INFORMATION: Arginine with a non-natural maleimide organic
``` functional group connected to its N-terminal amine

<400> SEQUENCE: 2

Xaa Glu Glu Ile Arg Arg Met Ala Glu Glu Ile Arg Arg Met Ala Arg
1               5                   10                  15

Glu Ile Glu Arg Met Ala Glu Glu Ile Glu Arg Arg Ala
            20                  25

<210> SEQ ID NO 3
<211> LENGTH: 29
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (1)..(1)
<223> OTHER INFORMATION: Aspartate with a non-natural maleimide organic
      functional group connected to its N-terminal amine

<400> SEQUENCE: 3

Xaa Glu Lys Ile Lys Asn Met Ala Asp Gln Ile Lys His Met Ala Trp
1               5                   10                  15

Met Ile Asp Arg Met Ala Glu Lys Ile Asp Arg Glu Ala
            20                  25

<210> SEQ ID NO 4
<211> LENGTH: 29
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (1)..(1)
<223> OTHER INFORMATION: Aspartate with a non-natural maleimide organic
      functional group connected to its N-terminal amine

<400> SEQUENCE: 4

Xaa Glu Glu Ile Arg Arg Met Ala Glu Glu Ile Arg Gln Met Ala Glu
1               5                   10                  15

Arg Ile Gln Gln Met Ala Glu Gln Ile Gln Gln Glu Ala
            20                  25